United States Patent
Liu et al.

(10) Patent No.: US 12,411,201 B2
(45) Date of Patent: Sep. 9, 2025

(54) POSITIONING METHOD, APPARATUS, AND SYSTEM

(71) Applicant: Huawei Technologies Co., Ltd., Shenzhen (CN)

(72) Inventors: Mengting Liu, Beijing (CN); Su Huang, Shanghai (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 504 days.

(21) Appl. No.: 17/854,274

(22) Filed: Jun. 30, 2022

(65) Prior Publication Data

US 2022/0334212 A1     Oct. 20, 2022

Related U.S. Application Data

(63) Continuation of application No. PCT/CN2019/130989, filed on Dec. 31, 2019.

(51) Int. Cl.
*H04L 1/00* (2006.01)
*G01S 5/00* (2006.01)
(Continued)

(52) U.S. Cl.
CPC .......... *G01S 5/0036* (2013.01); *G01S 5/0236* (2013.01); *H04L 5/0051* (2013.01); *H04W 64/00* (2013.01)

(58) Field of Classification Search
CPC ........ G01S 5/0036; G01S 5/0236; G01S 5/02; H04L 5/0051; H04L 5/00; H04W 64/00; H04W 4/026
(Continued)

(56) References Cited

U.S. PATENT DOCUMENTS

| | | |
|---|---|---|
| 10,327,109 B1 | 6/2019 | Maheshwari et al. |
| 2004/0127230 A1 | 7/2004 | Bevan et al. |

(Continued)

FOREIGN PATENT DOCUMENTS

| | | |
|---|---|---|
| CA | 3163434 A1 | 7/2021 |
| CN | 101388700 A | 3/2009 |

(Continued)

OTHER PUBLICATIONS

Huawei, et al., "Angle resolution and beam configuration related procedures for NR positioning," 3GPP TSG RAN WG1 #98b, Chongqing, China, Oct. 14-20, 2019, R1-1910393, 11 pages.

(Continued)

*Primary Examiner* — Tanmay K Shah
(74) *Attorney, Agent, or Firm* — Conley Rose, P.C.

(57) ABSTRACT

A positioning method includes: a location management device obtains a plurality of assistance data from one or more access network devices, where each assistance data includes one or more groups of mapping relationships corresponding to one or more preset angles, and each group of mapping relationships includes a mapping relationship between each of one or more PRS resource identifiers and power information corresponding to each PRS resource identifier at a corresponding preset angle; the location management device obtains, from a terminal device, power information corresponding to one or more PRS resource identifiers at each of a plurality of to-be-measured angles; and the location management device positions the terminal device based on the plurality of assistance data and the power information.

20 Claims, 10 Drawing Sheets

(51) Int. Cl.
  *G01S 5/02* (2010.01)
  *H04L 5/00* (2006.01)
  *H04W 64/00* (2009.01)
(58) Field of Classification Search
  USPC .................................................... 455/456.1
  See application file for complete search history.

(56) References Cited

U.S. PATENT DOCUMENTS

| | | | |
|---|---|---|---|
| 2015/0304671 | A1 | 10/2015 | Deshpande |
| 2018/0139763 | A1 | 5/2018 | Bitra et al. |
| 2018/0206144 | A1 | 7/2018 | Jiang et al. |
| 2019/0037529 | A1* | 1/2019 | Edge ............... H04W 64/00 |
| 2019/0392833 | A1 | 12/2019 | Maeng |
| 2020/0086778 | A1 | 3/2020 | Jeon |
| 2020/0120518 | A1 | 4/2020 | Geng |
| 2020/0336184 | A1* | 10/2020 | Sheng ............... H04B 7/0626 |
| 2021/0096224 | A1 | 4/2021 | Lee |
| 2021/0134156 | A1 | 5/2021 | Lee |
| 2021/0328747 | A1* | 10/2021 | Da ............... H04L 5/0058 |
| 2021/0354310 | A1 | 11/2021 | Shin et al. |
| 2022/0118996 | A1 | 4/2022 | Jaegal |
| 2022/0150866 | A1 | 5/2022 | Ren et al. |
| 2022/0279310 | A1 | 9/2022 | Xiao et al. |
| 2022/0326334 | A1 | 10/2022 | Liu et al. |
| 2023/0104681 | A1 | 4/2023 | Zeng et al. |
| 2023/0111011 | A1 | 4/2023 | Kumar et al. |
| 2023/0180187 | A1 | 6/2023 | Kim et al. |

FOREIGN PATENT DOCUMENTS

| | | |
|---|---|---|
| CN | 105589506 A | 5/2016 |
| CN | 109327901 A | 2/2019 |
| CN | 109842437 A | 6/2019 |
| CN | 109923842 A | 6/2019 |
| CN | 110536234 A | 12/2019 |
| EP | 4071495 A1 | 10/2022 |
| JP | 2015527756 A | 9/2015 |
| WO | 2017092376 A1 | 6/2017 |
| WO | 2019027595 A1 | 2/2019 |
| WO | 2021134722 A1 | 7/2021 |

OTHER PUBLICATIONS

Nokia, et al., "Angle of Departure UE positioning technique," 3GPP TSG RAN WG2 #108, Reno, USA, Nov. 18-22, 2019, R2-1916105, Resubmission of R2-1913593, 8 pages.

Huawei, et al., "Considerations on downlink-only positioning method in NR," 3GPP TSG RAN WG2 #107bis, Prague, CZ, Aug. 26-30, 2019, R2-1903037, 11 pages.

Deshpande, S., et al., "On Picture Order Count Signaling for VVC," Joint Video Experts Team (JVET) of ITU-T SG16 WP3 and ISO/IEC JTC1/SC29/WG11, 11th Meeting: Ljubljana, SI, July 10-18, JVET-I0449-v2, 4 pages.

Zhou, X., et al., "On POC Signalling," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, JCTVC-K0227, 6 pages.

3GPP TS 37.355 V15.0.0 Dec. 2019, "3rd Generation Partnership Project; Technical Specification Group Radio Access Network; LTE Positioning Protocol (LPP) (Release 15)," 224 pages.

3GPP TS 38.133 V16.1.0 Sep. 2019, "3rd Generation Partnership Project; Technical Specification Group Radio Access Network; NR; Requirements for support of radio resource management (Release 16)," 1045 pages.

3GPP TS 38.215 V15.5.0 Jun. 2019, "3rd Generation Partnership Project; Technical Specification Group Radio Access Network; NR; Physical layer measurements (Release 15)," 16 pages.

3GPP TS 38.300 V15.7.0 Sep. 2019, "3rd Generation Partnership Project; Technical Specification Group Radio Access Network; NR; NR and NG-RAN Overall Description; Stage 2 (Release 15)," 99 pages.

3GPP TS 38.305 V15.4.0 Jun. 2019, "3rd Generation Partnership Project; Technical Specification Group Radio Access Network; NG Radio Access Network (NG-RAN); Stage 2 functional specification of User Equipment (UE) positioning in NG-RAN (Release 15)," 72 pages.

3GPP TS 38.321 V15.7.0 Sep. 2019, "3rd Generation Partnership Project; Technical Specification Group Radio Access Network; NR; Medium Access Control (MAC) protocol specification (Release 15)," 78 pages.

3GPP TS 38.331 V15.7.0 Sep. 2019, "3rd Generation Partnership Project; Technical Specification Group Radio Access Network; NR; Radio Resource Control (RRC) protocol specification (Release 15)," 527 pages.

3GPP TS 38.455 V16.0.0 Jul. 2020, 3rd Generation Partnership Project; Technical Specification Group Radio Access Network; NG-RAN; NR Positioning Protocol A (NRPPa) (Release 16), 60 pages.

R1-1904004, Huawei, "DL and UL Reference Signals for NR Positioning," 3GPP TSG RAN WG1 Meeting #96bis, Xi''an, China, Apr. 8-12, 2019, 13 pages.

R3-192728, Huawei, "Discussion on DL positioning procedure," 3GPP TSG-RAN3 Meeting #104, Reno, Nevada, US, May 13-17, 2019, 3 pages.

R3-197794, "Ls on DL-AOD procedure," 3GPP TSG-RAN WG3 Meeting #106, Reno (NV), USA, Nov. 18-22, 2019, 1 pages.

R2-1913395, Revision of R2-1909416, Qualcomm Incorporated, "DL and UL NR Positioning Procedures," 3GPP TSG-RAN WG2 Meeting #107bis, Chongqing, China, Oct. 14-18, 2019, 53 pages.

R2-1915563, Revision of R2-1913399, Qualcomm Incorporated, "Assistance Data for DL- only UE-based mode," 3GPP TSG-RAN WG2 Meeting #108, Reno, Nevada, USA, Nov. 18-22, 2019, 14 pages.

* cited by examiner

POSITIONING METHOD, APPARATUS, AND SYSTEM

CROSS-REFERENCE TO RELATED APPLICATIONS

This is a continuation of Int'l Patent App. No. PCT/CN2019/130989 filed on Dec. 31, 2019, which is incorporated by reference.

FIELD

This disclosure relates to the field of positioning technologies, and in particular, to a positioning method, an apparatus, and a system.

BACKGROUND

Existing positioning methods mainly include a user equipment (UE)-based positioning method, a UE-assisted positioning method, and a standalone positioning method. In the UE-based positioning method, when assistance data is available, UE is not only responsible for providing a measurement result, but also responsible for performing location calculation based on the measurement result and the assistance data. In the UE-assisted positioning method, when assistance data is available, the UE is only responsible for providing a measurement result and does not perform location calculation, and a location management function (LMF) network element performs location calculation based on the measurement result and the assistance data. In the standalone positioning method, the UE performs measurement and location calculation without network assistance data. It can be learned that the assistance data may assist the LMF network element or the UE in performing location calculation.

Currently, for a downlink-angle of departure (DL-AoD) positioning method, one solution is a conclusion reached in a radio access network (RAN) 2 #108 meeting: Assistance data for performing location calculation includes spatial direction information of a positioning reference signal (PRS) resource, for example, an azimuth, an elevation, or a beam width. However, only a rough range of an angle (angle of departure or angle of arrival) can be estimated based on the assistance information in this solution, and high-accuracy positioning cannot be implemented. To achieve a high-accuracy positioning objective, new assistance data needs to be designed for accurate angle estimation.

SUMMARY

Embodiments provide a positioning method, an apparatus, and a system, to resolve a problem that only a rough range of an angle (angle of departure or angle of arrival) can be estimated based on existing assistance data and that high-accuracy positioning cannot be implemented.

To achieve the foregoing objective, the following technical solutions are used in embodiments.

According to a first aspect, a positioning method is provided. A communications apparatus that performs the method may be a location management device, or may be a module applied to a location management device, for example, a chip or a system-on-chip. The following is described by using an example in which an execution body is a location management device. The location management device obtains a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the location management device obtains, from a terminal device, power information corresponding to one or more PRS resource identifiers at each of a plurality of to-be-measured angles; and the location management device positions the terminal device based on the plurality of assistance data and the power information corresponding to the one or more PRS resource identifiers at each of the plurality of to-be-measured angles at the corresponding to-be-measured angle.

Currently, only a rough range of an angle (angle of departure or angle of arrival) can be estimated based on existing assistance data, and high-accuracy positioning cannot be implemented. Based on the positioning method provided in this embodiment, the assistance data in this embodiment includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the location management device can accurately estimate a to-be-measured angle (for example, an angle of departure or an angle of arrival) based on the plurality of assistance data and the power information corresponding to the one or more PRS resource identifiers at each of the plurality of to-be-measured angles at the corresponding to-be-measured angle, and can further implement high-accuracy positioning.

With reference to the first aspect, in a possible implementation, that the location management device positions the terminal device based on the plurality of assistance data and the power information corresponding to the one or more PRS resource identifiers at each of the plurality of to-be-measured angles includes: the location management device determines the plurality of to-be-measured angles based on the plurality of assistance data and the power information corresponding to the one or more PRS resource identifiers at each of the plurality of to-be-measured angles; and the location management device positions the terminal device based on the plurality of to-be-measured angles and location information of an access network device corresponding to each of the plurality of to-be-measured angles.

With reference to the first aspect, in a possible implementation, the positioning method provided in this embodiment further includes: the location management device receives a positioning request from a mobility management network element, where the positioning request is used to request to position the terminal device; and the location management device sends location information of the terminal device to the mobility management network element.

According to a second aspect, a positioning method is provided. A communications apparatus that performs the method may be an access network device, or may be a module applied to an access network device, for example, a chip or a system-on-chip. The following is described by using an example in which an execution body is an access network device. The access network device establishes or updates assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the access network device sends the assistance data to a location management device.

Currently, only a rough range of an angle (angle of departure or angle of arrival) can be estimated based on existing assistance data, and high-accuracy positioning cannot be implemented. Based on the positioning method provided in this embodiment, the assistance data in this embodiment includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the location management device can accurately estimate an angle (for example, an angle of departure or an angle of arrival) based on the plurality of assistance data and power information corresponding to one or more PRS resource identifiers at each of a plurality of to-be-measured angles, and can further implement high-accuracy positioning.

With reference to the second aspect, in a possible implementation, before the access network device sends the assistance data to the location management device, the method further includes: the access network device receives a first request message from the location management device, where the first request message is used to request the assistance data.

With reference to the first aspect or the second aspect, in a possible implementation, the corresponding power information includes a power value corresponding to each of the one or more PRS resource identifiers at the corresponding preset or to-be-measured angle.

With reference to the first aspect or the second aspect, in a possible implementation, the corresponding power information includes a value obtained after the power value corresponding to each of the one or more PRS resource identifiers at the corresponding preset or to-be-measured angle is compressed.

In this manner, because the power value corresponding to each PRS resource identifier at the corresponding preset angle is compressed, signaling overheads can be reduced during transmission of the assistance data, and a positioning latency and power consumption can be reduced.

With reference to the first aspect or the second aspect, in a possible implementation, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

With reference to the first aspect or the second aspect, in a possible implementation, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

This solution is applicable to a case in which a difference between values is relatively large. Because a smaller compressed value can be obtained in this way, signaling overheads are reduced to a greater extent.

With reference to the first aspect or the second aspect, in a possible implementation, the corresponding power information includes a value relative to a reference second power value, for the power value corresponding to each of the one or more PRS resource identifiers at the corresponding preset or to-be-measured angle, where the second power value is a largest one of power values corresponding to different PRS resource identifiers at the one or more angles at the corresponding angle.

With reference to the first aspect or the second aspect, in a possible implementation, the corresponding power information includes a value relative to a reference previous power value, for the power information corresponding to each of the one or more PRS resource identifiers at the corresponding preset or to-be-measured angle, where power values corresponding to different PRS resource identifiers at the one or more angles at the corresponding angle are sorted in ascending order or descending order.

This solution is applicable to a case in which a difference between values is relatively large. Because a smaller compressed value can be obtained in this way, signaling overheads are reduced to a greater extent.

With reference to the first aspect or the second aspect, in a possible implementation, the power value includes a radiated power value or a received power value.

With reference to the first aspect or the second aspect, in a possible implementation, the one or more PRS resource identifiers are PRS resource identifiers of all PRS resources that need to be measured at the corresponding preset or to-be-measured angle.

With reference to the first aspect or the second aspect, in a possible implementation, the one or more PRS resource identifiers are PRS resource identifiers of some PRS resources that need to be measured at the corresponding preset or to-be-measured angle.

This solution can reduce a data amount of the assistance data to some extent. Therefore, signaling overheads can be reduced during transmission of the assistance data, and the positioning latency and power consumption can be reduced.

For example, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

According to a third aspect, a communications apparatus is provided, and the communications apparatus is configured to perform the method according to the first aspect or any possible implementation of the first aspect. The communications apparatus may be the location management device in any one of the first aspect or the possible implementations of the first aspect, or a module applied to the location management device, for example, a chip or a system-on-chip. The communications apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

With reference to the third aspect, in a possible implementation, the communications apparatus includes a transceiver module and a processing module, where the transceiver module is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the transceiver module is further configured to obtain, from a terminal device, power information corresponding to one or more PRS resource identifiers at each of a plurality of to-be-measured angles; and the processing module is configured to position the terminal device based on the plurality of assistance data and the power information corresponding to the one or more PRS resource identifiers at each of the plurality of to-be-measured angles at the corresponding to-be-measured angle.

With reference to the third aspect, in a possible implementation, the processing module is further configured to determine the plurality of to-be-measured angles based on the plurality of assistance data and the power information corresponding to the one or more PRS resource identifiers at each of the plurality of to-be-measured angles at the corresponding to-be-measured angle; and position the terminal device based on the plurality of to-be-measured angles and location information of an access network device corresponding to each of the plurality of to-be-measured angles.

With reference to the third aspect, in a possible implementation, the transceiver module is further configured to receive a positioning request from a mobility management network element, where the positioning request is used to request to position the terminal device; and the transceiver module is further configured to send location information of the terminal device to the mobility management network element.

According to a fourth aspect, a communications apparatus is provided. The communications apparatus may be the location management device in any one of the first aspect or the possible implementations of the first aspect, or a module applied to the location management device, for example, a chip or a system-on-chip. The communications apparatus includes a transceiver and a processor, where the transceiver is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the transceiver is further configured to obtain, from a terminal device, power information corresponding to one or more PRS resource identifiers at each of a plurality of to-be-measured angles; and the processor is configured to position the terminal device based on the plurality of assistance data and the power information corresponding to the one or more PRS resource identifiers at each of the plurality of to-be-measured angles at the corresponding to-be-measured angle.

With reference to the fourth aspect, in a possible implementation, the processor is further configured to determine the plurality of to-be-measured angles based on the plurality of assistance data and the power information corresponding to the one or more PRS resource identifiers at each of the plurality of to-be-measured angles at the corresponding to-be-measured angle; and position the terminal device based on the plurality of to-be-measured angles and location information of an access network device corresponding to each of the plurality of to-be-measured angles.

With reference to the fourth aspect, in a possible implementation, the transceiver is further configured to receive a positioning request from a mobility management network element, where the positioning request is used to request to position the terminal device; and the transceiver is further configured to send location information of the terminal device to the mobility management network element.

With reference to the third aspect or the fourth aspect, in a possible implementation, the corresponding power information includes a power value corresponding to each of the one or more PRS resource identifiers at the corresponding preset or to-be-measured angle.

With reference to the third aspect or the fourth aspect, in a possible implementation, the corresponding power information includes a value obtained after the power value corresponding to each of the one or more PRS resource identifiers at the corresponding preset or to-be-measured angle is compressed.

With reference to the third aspect or the fourth aspect, in a possible implementation, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

With reference to the third aspect or the fourth aspect, in a possible implementation, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

With reference to the third aspect or the fourth aspect, in a possible implementation, the corresponding power information includes a value relative to a reference second power value, for the power information corresponding to each of the one or more PRS resource identifiers at the corresponding preset or to-be-measured angle, where the second power value is a largest one of power values corresponding to different PRS resource identifiers at the one or more angles at the corresponding angle.

With reference to the third aspect or the fourth aspect, in a possible implementation, the corresponding power information includes a value relative to a reference previous power value, for the power information corresponding to each of the one or more PRS resource identifiers at the corresponding preset or to-be-measured angle, where power values corresponding to different PRS resource identifiers at the one or more angles at the corresponding angle are sorted in ascending order or descending order.

With reference to the third aspect or the fourth aspect, in a possible implementation, the power value includes a radiated power value or a received power value.

With reference to the third aspect or the fourth aspect, in a possible implementation, the one or more PRS resource identifiers are PRS resource identifiers of all PRS resources that need to be measured at the corresponding preset or to-be-measured angle.

With reference to the third aspect or the fourth aspect, in a possible implementation, the one or more PRS resource identifiers are PRS resource identifiers of some PRS resources that need to be measured at the corresponding preset or to-be-measured angle.

For example, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

According to a fifth aspect, a communications apparatus is provided. The communications apparatus may be the location management device in any one of the first aspect or the possible implementations of the first aspect, or a module applied to the location management device, for example, a chip or a system-on-chip. The communications apparatus includes at least one processor configured to perform the method in any one of the first aspect or the possible implementations of the first aspect.

For example, the communications apparatus further includes a memory, the memory is coupled to the at least one processor, and the processor is configured to perform the method in any one of the first aspect or the possible implementations of the first aspect.

In a possible implementation, the memory is configured to store program instructions and data. The memory is coupled to the at least one processor, and the at least one processor may invoke and execute the program instructions stored in the memory, to perform the method in any one of the first aspect or the possible implementations of the first aspect.

For example, the communications apparatus further includes a communications interface, and the communications interface is used by the communications apparatus to communicate with another device. When the communications apparatus is the location management device, the communications interface is a transceiver, an input/output interface, a circuit, or the like.

In a possible design, that the communications apparatus includes at least one processor and a communications interface configured to perform the method in any one of the first aspect or the possible implementations of the first aspect specifically includes: the at least one processor communicates with an outside by using the communications interface; and the at least one processor is configured to run a computer program, so that the communications apparatus performs the method in any one of the first aspect or the possible implementations of the first aspect. It may be understood that the outside may be an object other than the processor or an object other than the communications apparatus.

In another possible design, the communications apparatus is a chip or a system-on-chip. The communications interface may be an input/output interface, an interface circuit, an output circuit, an input circuit, a pin, a related circuit, or the like in the chip or the system-on-chip. The processor may alternatively be embodied as a processing circuit or a logic circuit.

According to a sixth aspect, a computer-readable storage medium is provided. A computer program is stored in the computer-readable storage medium. When the computer program is executed by a communications apparatus, the communications apparatus is enabled to perform the method in any one of the first aspect or the possible implementations of the first aspect.

According to a seventh aspect, a computer program product including instructions is provided. When the instructions are executed by a computer, a communications apparatus is enabled to perform the method in any one of the first aspect or the possible implementations of the first aspect.

For technical effects brought by any design manner of the third to the seventh aspects, refer to the technical effects brought by different design manners of the first aspect. Details are not described herein again.

According to an eighth aspect, a communications apparatus is provided and is configured to perform the method in any one of the second aspect or the possible implementations of the second aspect. The communications apparatus may be the access network device in any one of the second aspect or the possible implementations of the second aspect, or a module applied to the access network device, for example, a chip or a system-on-chip. The communications apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

With reference to the eighth aspect, in a possible implementation, the communications apparatus includes a transceiver module and a processing module, where the processing module is configured to establish or update assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver module is configured to send the assistance data to a location management device.

With reference to the eighth aspect, in a possible implementation, before sending the assistance data to the location management device, the transceiver module is further configured to receive a first request message from the location management device, where the first request message is used to request the assistance data.

According to a ninth aspect, a communications apparatus is provided. The communications apparatus may be the access network device in any one of the second aspect or the possible implementations of the second aspect, or a module applied to the access network device, for example, a chip or a system-on-chip. The communications apparatus includes a transceiver and a processor, where the processor is configured to establish or update assistance data, where the assistance data includes one or more groups of mapping relationships corresponding to one or more angles, each of the one or more groups of mapping relationships corresponds to one of the one or more angles, and each group of mapping relationships includes a mapping relationship between each of one or more PRS resource identifiers and power information corresponding to each PRS resource identifier at a corresponding angle; and the transceiver is configured to send the assistance data to a location management device.

With reference to the ninth aspect, in a possible implementation, before sending the assistance data to the location management device, the transceiver is further configured to receive a first request message from the location management device, where the first request message is used to request the assistance data.

With reference to the eighth aspect or the ninth aspect, in a possible implementation, the corresponding power information includes a power value corresponding to each of the one or more PRS resource identifiers at the corresponding preset or to-be-measured angle.

With reference to the eighth aspect or the ninth aspect, in a possible implementation, the corresponding power information includes a value obtained after the power value corresponding to each of the one or more PRS resource identifiers at the corresponding preset or to-be-measured angle is compressed.

With reference to the eighth aspect or the ninth aspect, in a possible implementation, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

With reference to the eighth aspect or the ninth aspect, in a possible implementation, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

With reference to the eighth aspect or the ninth aspect, in a possible implementation, the corresponding power information includes a value relative to a reference second power value, for the power information corresponding to each of the one or more PRS resource identifiers at the corresponding preset or to-be-measured angle, where the second power value is a largest one of power values corresponding to different PRS resource identifiers at the one or more angles at the corresponding angle.

With reference to the eighth aspect or the ninth aspect, in a possible implementation, the corresponding power information includes a value relative to a reference previous power value, for the power information corresponding to each of the one or more PRS resource identifiers at the corresponding preset or to-be-measured angle, where power values corresponding to different PRS resource identifiers at the one or more angles at the corresponding angle are sorted in ascending order or descending order.

With reference to the eighth aspect or the ninth aspect, in a possible implementation, the power value includes a radiated power value or a received power value.

With reference to the eighth aspect or the ninth aspect, in a possible implementation, the one or more PRS resource identifiers are PRS resource identifiers of all PRS resources that need to be measured at the corresponding preset or to-be-measured angle.

With reference to the eighth aspect or the ninth aspect, in a possible implementation, the one or more PRS resource identifiers are PRS resource identifiers of some PRS resources that need to be measured at the corresponding preset or to-be-measured angle.

For example, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

According to a tenth aspect, a communications apparatus is provided. The communications apparatus may be the access network device in any one of the second aspect or the possible implementations of the second aspect, or a module applied to the access network device, for example, a chip or a system-on-chip. The communications apparatus includes at least one processor configured to perform the method in any one of the second aspect or the possible implementations of the second aspect.

For example, the communications apparatus further includes a memory, the memory is coupled to the at least one processor, and the processor is configured to perform the method in any one of the second aspect or the possible implementations of the second aspect.

In a possible implementation, the memory is configured to store program instructions and data. The memory is coupled to the at least one processor, and the at least one processor may invoke and execute the program instructions stored in the memory, to perform the method in any one of the second aspect or the possible implementations of the second aspect.

For example, the communications apparatus further includes a communications interface, and the communications interface is used by the communications apparatus to communicate with another device. When the communications apparatus is the access network device, the communications interface is a transceiver, an input/output interface, a circuit, or the like.

In a possible design, that the communications apparatus includes at least one processor and a communications interface configured to perform the method in any one of the second aspect or the possible implementations of the second aspect specifically includes: the at least one processor communicates with an outside by using the communications interface; and the processor is configured to run a computer program, so that the communications apparatus performs the method in any one of the second aspect or the possible implementations of the second aspect. It may be understood that the outside may be an object other than the processor or an object other than the communications apparatus.

In another possible design, the communications apparatus is a chip or a system-on-chip. The communications interface may be an input/output interface, an interface circuit, an output circuit, an input circuit, a pin, a related circuit, or the like in the chip or the system-on-chip. The processor may alternatively be embodied as a processing circuit or a logic circuit.

According to an eleventh aspect, a computer-readable storage medium is provided. A computer program is stored in the computer-readable storage medium. When the computer program is executed by a communications apparatus, the communications apparatus is enabled to perform the method in any one of the second aspect or the possible implementations of the second aspect.

According to a twelfth aspect, a computer program product including instructions is provided. When the instructions are executed by a computer, a communications apparatus is enabled to perform the method in any one of the second aspect or the possible implementations of the second aspect.

For technical effects brought by any design of the eighth aspect to the twelfth aspect, refer to the technical effects brought by the different designs of the second aspect, and details are not described herein again.

According to a thirteenth aspect, a positioning system is provided. The positioning system includes a communications apparatus configured to implement the method according to the first aspect and one or more communications apparatuses configured to perform the method according to the second aspect.

DETAILED DESCRIPTION

For ease of understanding solutions in embodiments, brief descriptions or definitions of related technologies are first provided as follows:

First, Assistance Data

The assistance data may assist an LMF network element in performing location calculation in a UE-assisted positioning method, or the assistance data may assist UE in performing location calculation in a UE-based positioning method. Using the UE-assisted positioning method as an example, a base station and/or the UE need/needs to transmit the assistance data to the LMF network element, to assist the LMF network element in performing location calculation. Content of the assistance data depends on capabilities of the base station and the UE. Using a DL-AoD positioning method as an example, the assistance data may be classified into the following types:

measurement assistance data: including PRS configuration information, and the like; and calculation assistance data: including a PRS resource identifier (ID), geographical coordinates of a transmission-reception point (TRP), timing information of the TRP, and the like.

Second, Angle of Departure (AoD)

Figure 1:
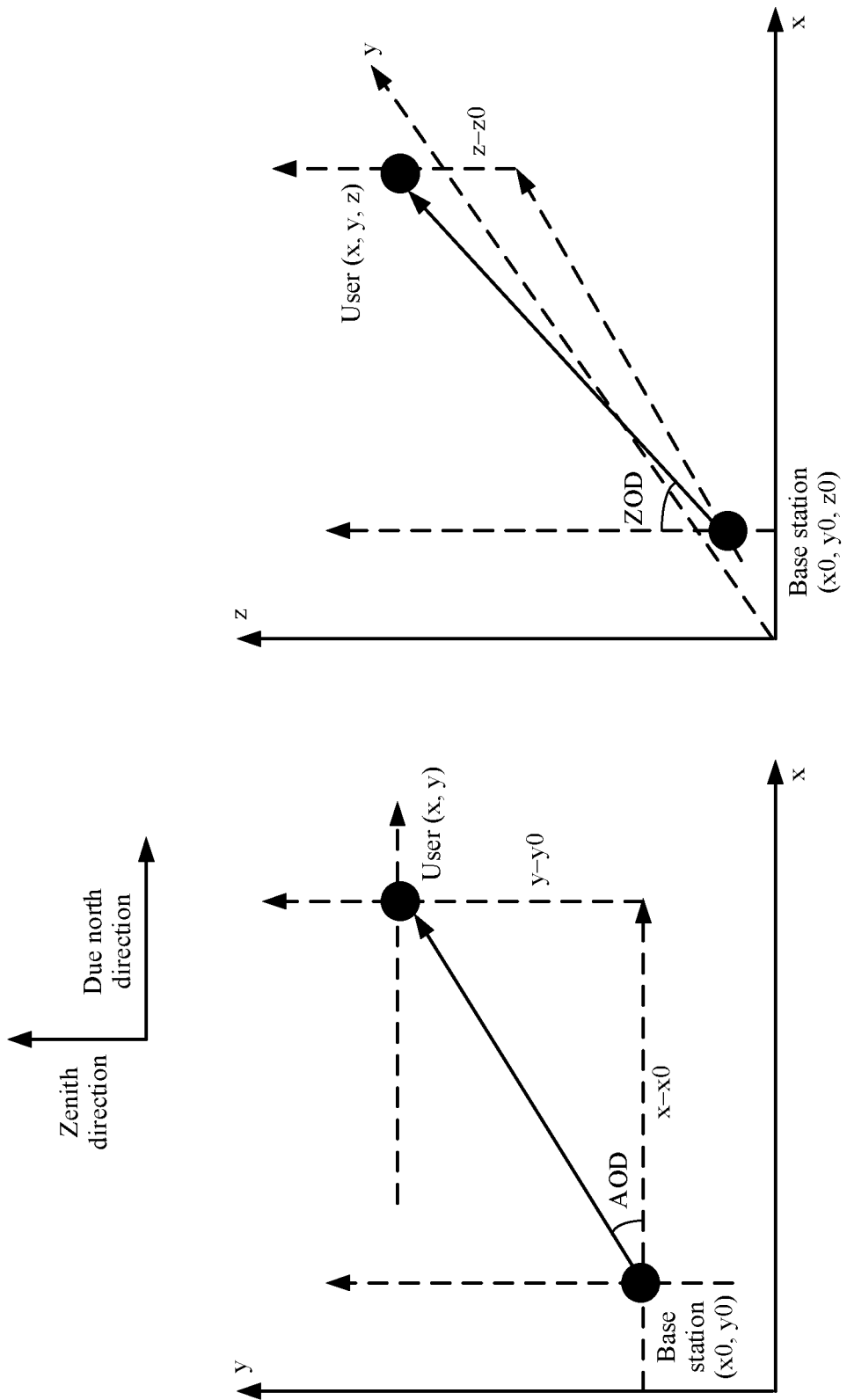
FIG. 1 is a schematic diagram of an existing angle of departure.

An azimuth angle of departure (AOD) and a zenith angle of departure are important angle information in an angle-based positioning method. As shown in FIG. 1, both the azimuth angle of departure and the zenith angle of departure are information about an angle of departure (radio signals sent from the base station to a user). The azimuth angle of departure is an included angle with a due north direction (a clockwise direction is positive), and the zenith angle of departure is an included angle with a zenith direction. If coordinate information of the base station and information about the azimuth angle of departure and the zenith angle of departure are obtained, a location (three-dimensional) of the user may be calculated. For ease of description, in the embodiments, the azimuth angle of departure and the zenith angle of departure are collectively referred to as the angle of departure. The AOD hereinafter also refers to the angle of departure, and is not further subdivided. This is centrally described herein, and not described again later.

Third, DL-AOD Positioning Method

The DL-AOD positioning method mainly depends on angle estimation information from a plurality of TRPs, and includes the following two steps:

1. angle measurement and reporting; and
2. location calculation.

Figure 2:
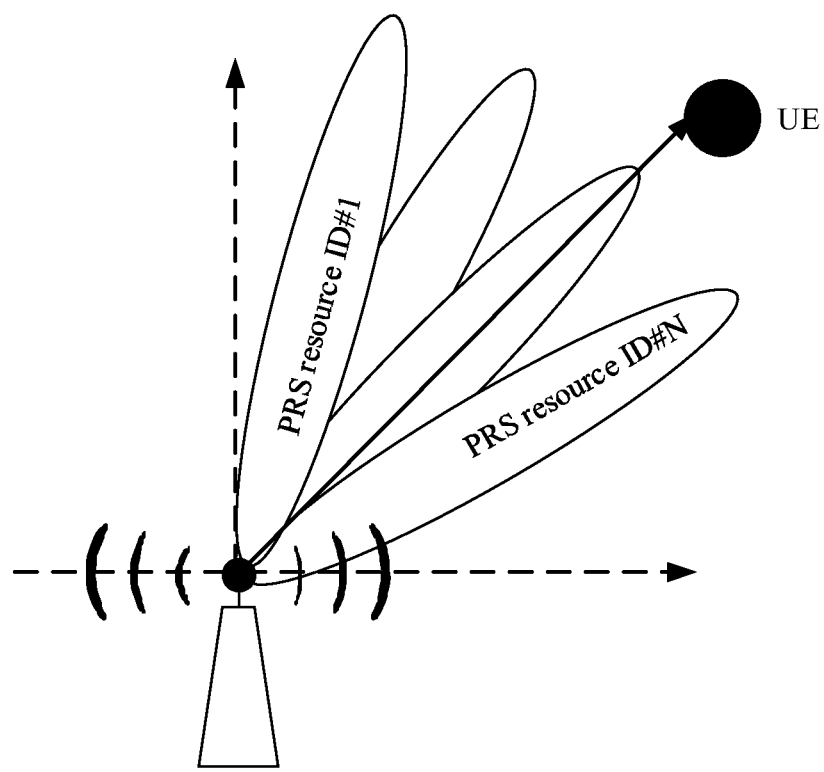
FIG. 2 is a schematic diagram of a UE-based AoD positioning scenario according to an embodiment.
Figure 3:
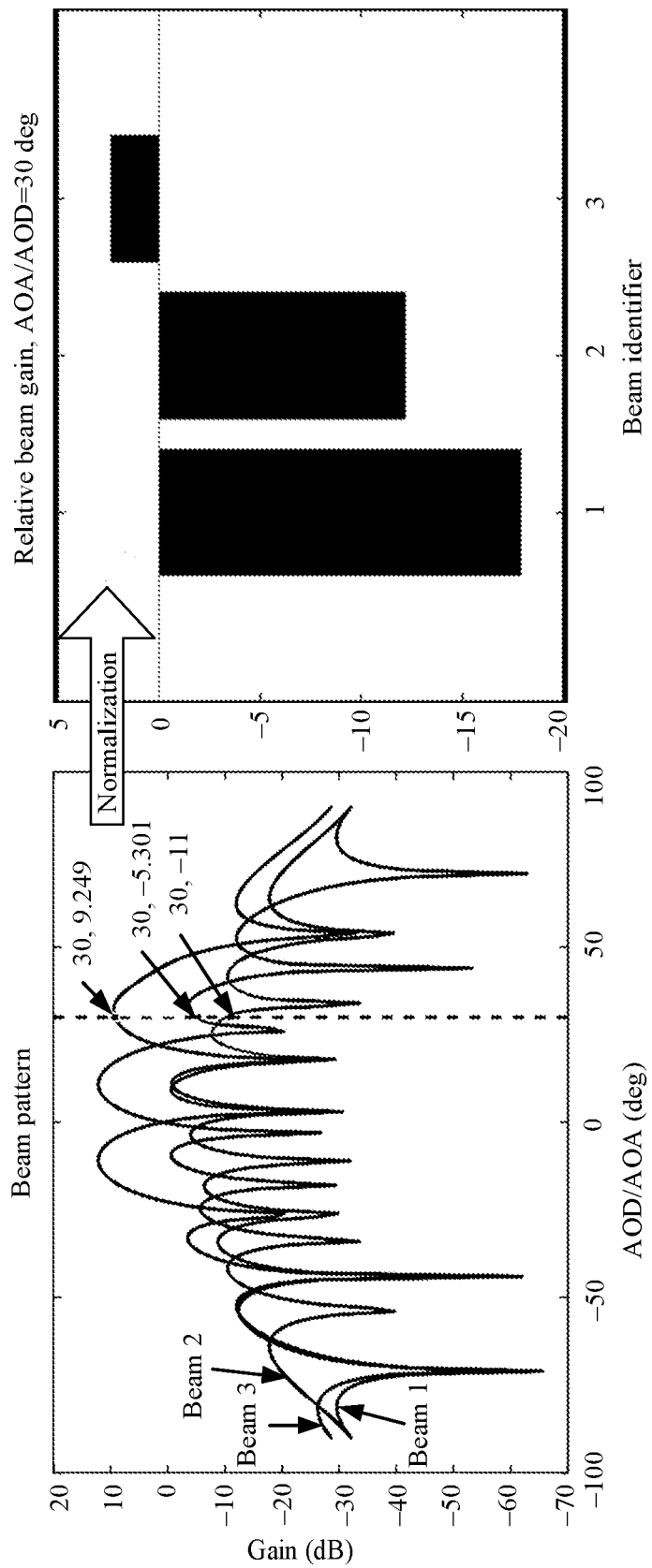
FIG. 3 is a schematic diagram of AOD estimation based on a relative beam gain according to an embodiment.

As shown in FIG. 2, for a specific AOD, the UE may obtain a beam gain (equivalent to a fingerprint corresponding to the AOD) of each beam through measurement by sweeping each beam in a beam sweeping manner. A beam pattern may be formed by traversing values of the AoD, as shown in a left diagram in FIG. 3. For example, when the AoD is 30 degrees, beam gains obtained through measurement at a beam #1, a beam #2, and a beam #3 are −11 dB, −5.3 dB, and 9 dB respectively. To eliminate an unknown path loss, normalization processing may be performed on the beam gains. As shown in a right diagram in FIG. 3, relative gains of the three beams after the normalization processing may be considered as a relative gain envelope when the AoD is 30 degrees. Further, based on the beam gain measured at each beam, a maximum likelihood algorithm may be used to select an angle that best matches the relative gain envelope (equivalent to a prestored angle fingerprint database) to estimate a corresponding AoD value. For example, in the embodiments, the beam gain may be, for example, reference signal received power (RSRP).

Figure 4:
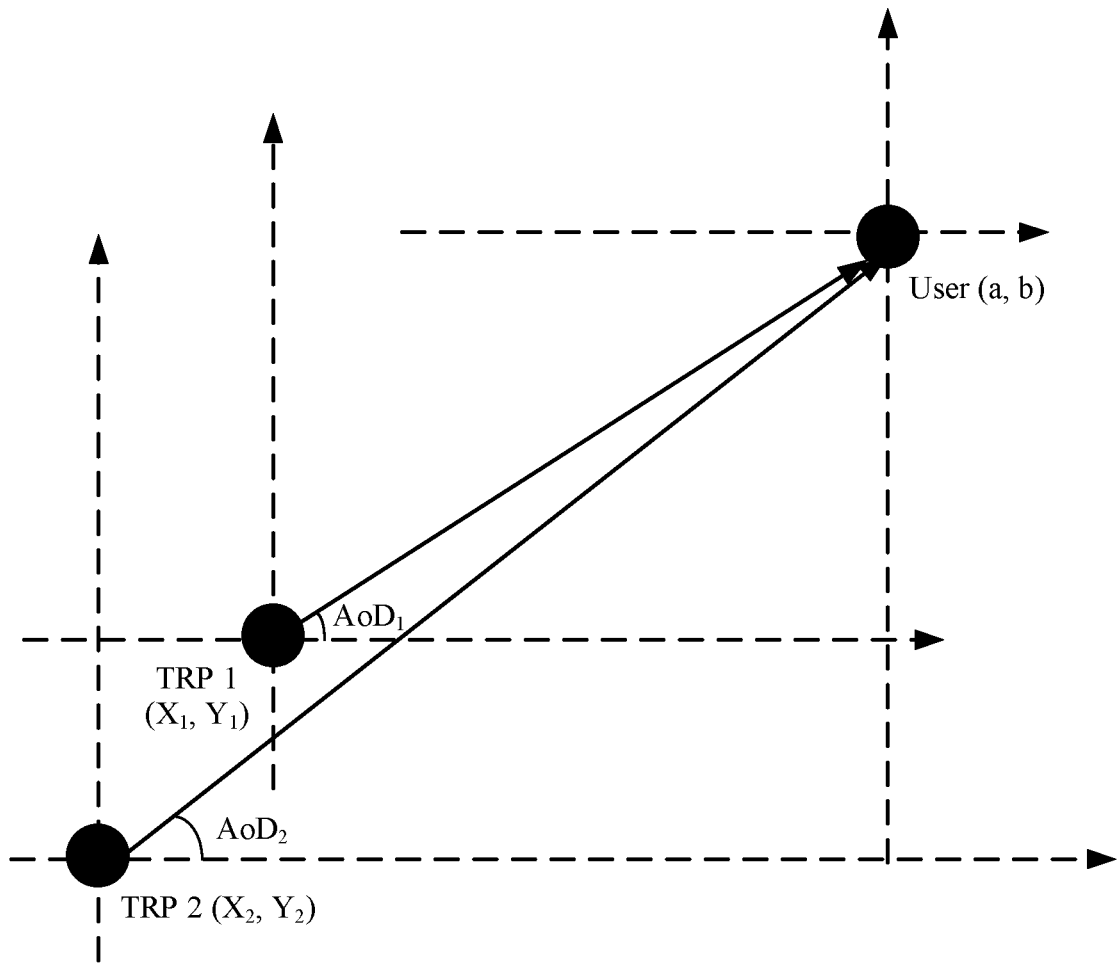
FIG. 4 is a schematic diagram of a DL-AOD positioning method according to an embodiment.

Further, if geographical coordinate information of the TRP and the value of the AoD are obtained, the location of the user may be estimated. FIG. 4 is a schematic diagram of the DL-AOD positioning method in a two-dimensional plane. Based on angle information ($AoD_1$, $AoD_2$) estimated by using the foregoing method, geographical coordinate information ($X_1$, $Y_1$) of a TRP 1, geographical coordinate information ($X_2$, $Y_2$) of a TRP 2, and a triangle related theory, location coordinates (a, b) of the UE may be obtained b solving an equation of the following formula (1):

$$\begin{cases} \tan AoD_1 = \frac{X_1 - a}{Y_1 - b} \\ \tan AoD_2 = \frac{X_2 - a}{Y_2 - b} \end{cases} \qquad \text{Formula (1)}$$

In the foregoing solution, the assistance data used to perform location calculation includes spatial direction information of a PRS resource, such as an azimuth, an elevation, or a beam width. However, only a coarse-grained angle range can be provided based on the assistance information in the solution, and high-accuracy positioning cannot be implemented. To achieve a high-accuracy positioning objective in Rel-17, new assistance data needs to be designed for accurate angle estimation.

The following describes the technical solutions in embodiments with reference to the accompanying drawings.

The technical solutions may be applied to various communications systems, for example, a Long-Term Evolution (LTE) system, an LTE frequency-division duplex (FDD) system, an LTE time-division duplex (TDD) system, a universal mobile telecommunications system (UMTS), a Worldwide Interoperability for Microwave Access (WiMAX) communications system, and a future 5th generation (5G) system or New Radio (NR). The 5G mobile communications system includes a 5G mobile communications system with non-standalone (NSA) networking or a 5G mobile communications system with standalone (SA) networking. The technical solutions are further applicable to a future communications system, for example, a 6th generation mobile communications system. Alternatively, the communications system may be a public land mobile network (PLMN), a device-to-device (D2D) communications system, a machine-to-machine (M2M) communications system, an Internet of things (IoT) communications system, or another communications system.

Figure 5:
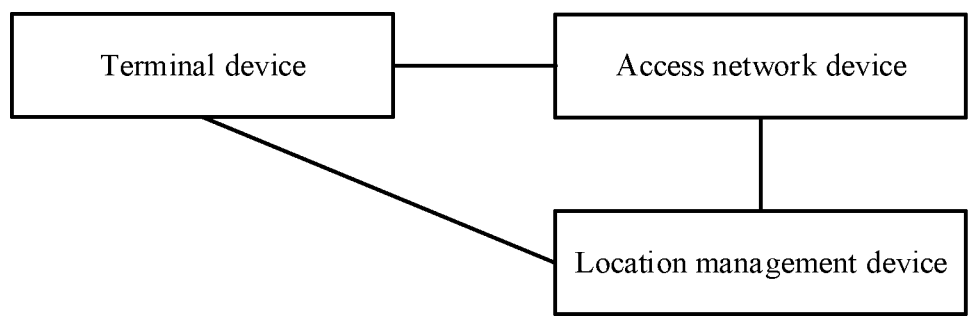
FIG. 5 is a schematic diagram of an architecture of a positioning system to which a positioning method according to an embodiment is applied.

FIG. 5 is a schematic diagram of an architecture of a positioning system to which a positioning method according to an embodiment is applied. As shown in FIG. 5, the positioning system includes a terminal device, one or more access network devices (one access network device is used as an example for illustration in FIG. 5), and a location management device. The terminal device, the access network device, and the location management device may directly communicate with each other, or may communicate with each other through forwarding by another device. This is not specifically limited in this embodiment. Although not shown, the positioning system may further include another network element such as a mobility management network element. This is not specifically limited in this embodiment.

The location management device obtains a plurality of assistance data from the one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the location management device obtains, from a terminal device, power information corresponding to one or more PRS resource identifiers at each of a plurality of to-be-measured angles; and further, the location management device positions the terminal device based on the plurality of assistance data and the power information corresponding to the one or more PRS resource identifiers at each of the plurality of to-be-measured angles at the corresponding to-be-measured angle. A detailed implementation of this solution is described in subsequent method embodiments, and details are not described herein.

Currently, only a rough range of an angle (angle of departure or angle of arrival) can be estimated based on existing assistance data, and high-accuracy positioning cannot be implemented. Based on the communications system provided, the assistance data in this embodiment includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the location management device can accurately estimate a to-be-measured angle (for example, an angle of departure or an angle of arrival) based on the plurality of assistance data and the power information corresponding to the one or more PRS resource identifiers at each of the plurality of to-be-measured angles at the corresponding to-be-measured angle, and can further implement high-accuracy positioning.

Optionally, the location management device in this embodiment may be an LMF network element or a location management component (LMC) network element, or may be a local location management function (LLMF) network element located in a network device.

Optionally, the positioning system provided in this embodiment is applicable to the foregoing various communications systems. A 5G mobile communications system is used as an example. A network element or an entity corresponding to the access network device in FIG. 5 may be a next-generation radio access network (NG-RAN) device in the 5G mobile communications system. The network element or entity corresponding to the mobility management network element may be an access and mobility management function (AMF) network element in the 5G mobile communications system. This is not specifically limited in this embodiment.

Figure 6:
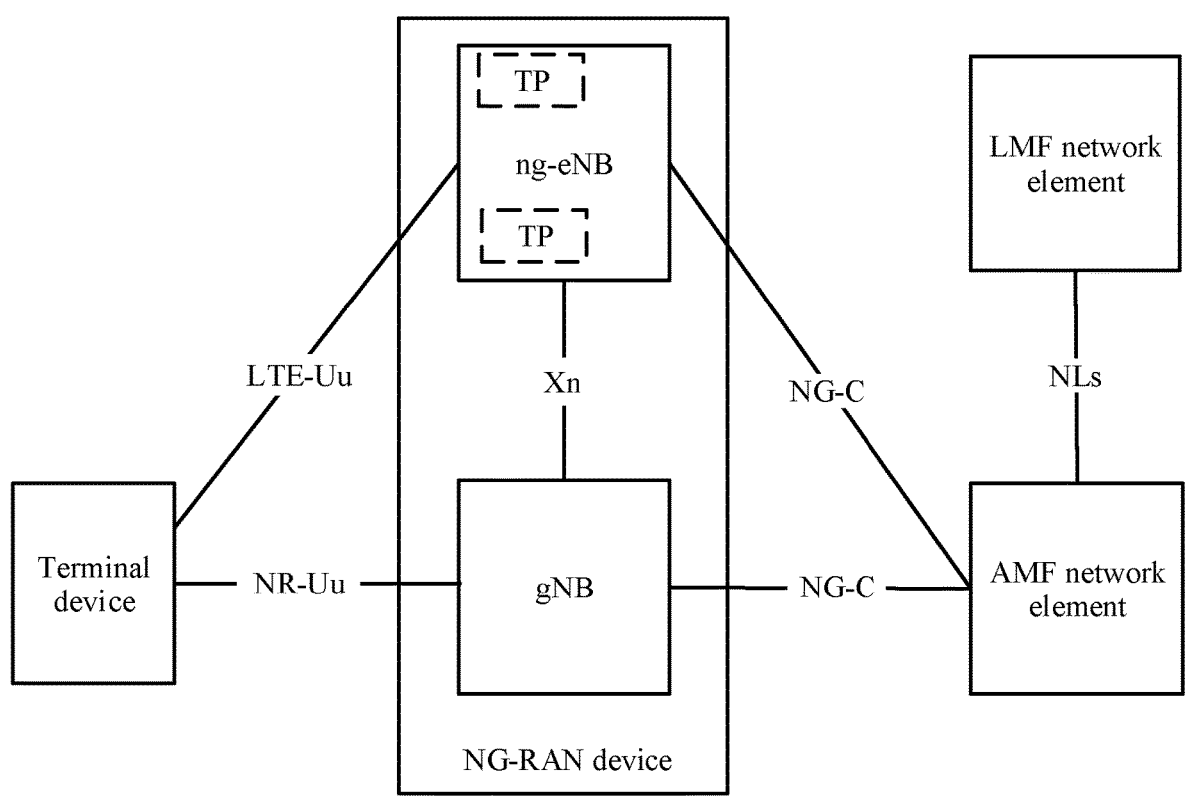
FIG. 6 is a schematic diagram of an architecture of a positioning system to which a positioning method according to an embodiment is applied in a 5G mobile communications system.

For example, FIG. 6 is a schematic diagram of an architecture of a positioning system to which a positioning method according to an embodiment is applied in a 5G mobile communications system. As shown in FIG. 6, in the positioning system, a terminal device is connected to a radio access network through a next-generation evolved NodeB (ng-eNB) and a next-generation NodeB (gNB) respectively by using an LTE-Uu interface and/or an NR-Uu interface. The radio access network is connected to a core network through an AMF network element by using an NG-C interface. The NG-RAN includes one or more ng-eNBs (one ng-eNB is used as an example for illustration in FIG. 6). Alternatively, the NG-RAN may include one or more gNBs (one gNB is used as an example for illustration in FIG. 6). Alternatively, the NG-RAN may include one or more ng-eNBs and one or more gNBs. The ng-eNB is an LTE base station that accesses a 5G core network, and the gNB is a 5G base station that accesses the 5G core network. The core network includes an AMF network element and an LMF network element. The AMF network element is configured to implement functions such as access management. The LMF network element is configured to implement functions such as positioning or positioning assistance. The AMF network element is connected to the LMF network element by using an NLs interface.

Figure 7:
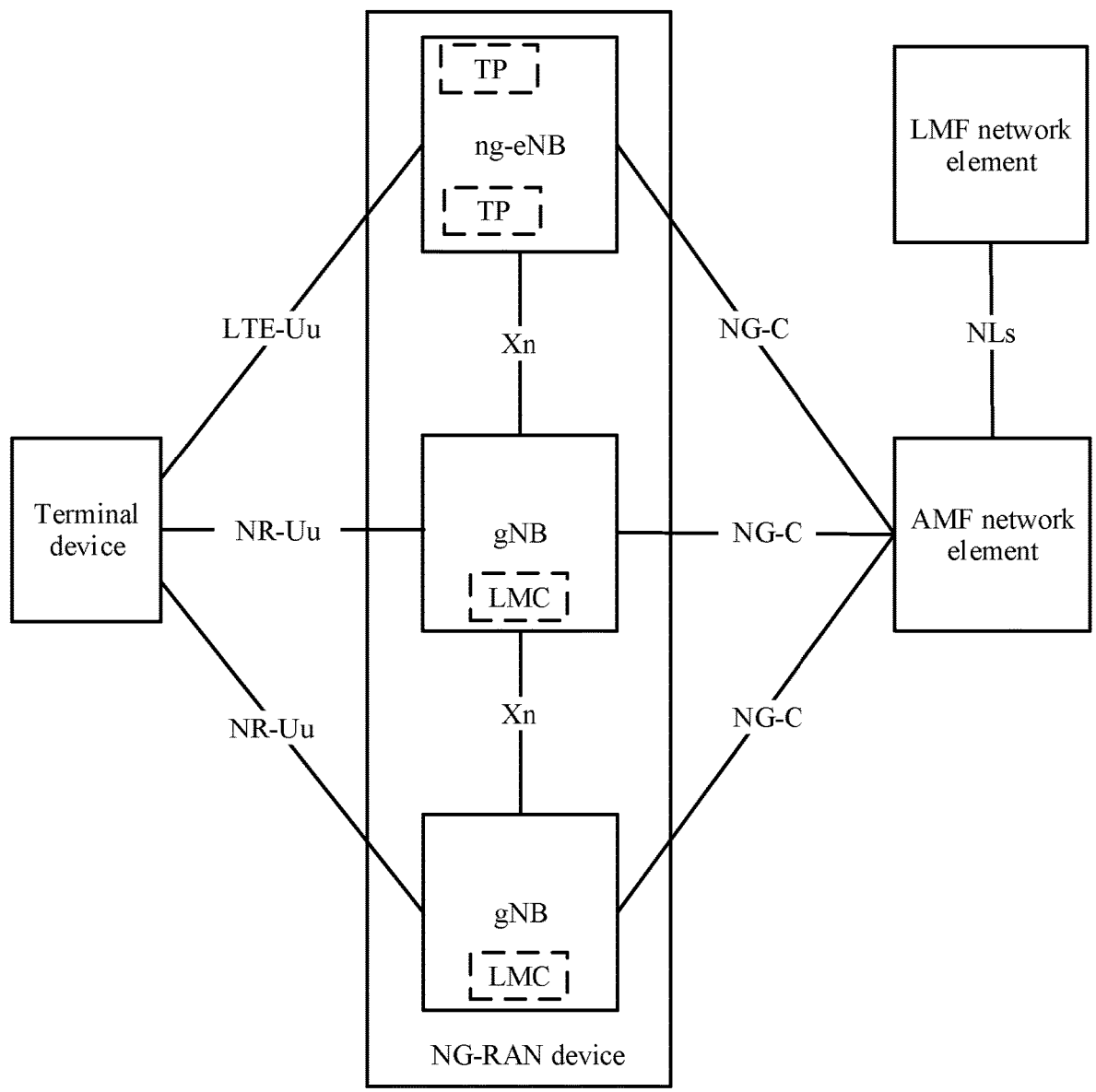
FIG. 7 is a schematic diagram of an architecture of another positioning system to which a positioning method according to an embodiment is applied in a 5G mobile communications system.

For example, FIG. 7 is a schematic diagram of an architecture of another positioning system to which a positioning method according to an embodiment is applied in a 5G mobile communications system. A difference between the architectures of the positioning systems in FIG. 7 and FIG. 6 lies in that a location management function apparatus or component (for example, an LMF network element) in FIG. 6 is deployed in a core network, but a location management function apparatus or component (for example, an LMC network element) in FIG. 7 may be deployed in an NG-RAN device. As shown in FIG. 7, a gNB includes an LMC network element. The LMC network element is a part of a functional component of an LMF network element, and may be integrated into the gNB of the NG-RAN device.

It should be understood that the device or function node included in the positioning system in FIG. 6 or FIG. 7 is merely an example for description, and does not constitute a limitation on the embodiments. Actually, the positioning system in FIG. 6 or FIG. 7 may further include another network element, device, or function node that has an interaction relationship with the device or function node shown in the figure. This is not specifically limited herein.

Optionally, the terminal device (terminal equipment) may be an access terminal, a subscriber unit, a subscriber station, a mobile station, a mobile station, a relay station, a remote station, a remote terminal, a mobile device, a user terminal, UE, a terminal, a wireless communications device, a user agent, a user apparatus, a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved PLMN, a terminal device in a future Internet of Vehicles, or the like. This is not limited in the embodiments.

As an example rather than a limitation, the terminal may be a mobile phone, a tablet computer, a computer with a radio transceiver function, a virtual reality terminal device, an augmented reality terminal device, a wireless terminal in industrial control, a wireless terminal in unmanned driving, a wireless terminal in remote surgery, a wireless terminal in a smart grid, a wireless terminal in transportation safety, a wireless terminal in a smart city, or a wireless terminal in a smart home.

As an example rather than a limitation, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an IoT system. IoT is an important part of future development of information technologies. A main technical feature of the IoT is connecting a thing to a network by using a communications technology, to implement an intelligent network for interconnection between a person and a machine or between things. In the embodiments, an IoT technology may implement massive connections, deep coverage, and terminal power saving by using, for example, a narrowband (NB) technology.

In addition, the terminal device may further include a sensor, for example, an intelligent printer, a train detector, or a gas station. Main functions of the terminal device include: collecting data (for some terminal devices), receiving control information and downlink data of an access network device, sending electromagnetic waves, and transmitting uplink data to the access network device.

Optionally, the access network device may be any communications device configured to communicate with the terminal device and having a radio transceiver function. The access network device includes but is not limited to an evolved NodeB (eNB), a baseband unit (BBU), an access point (AP) in a Wi-Fi system, a wireless relay node, a wireless backhaul node, a transmission point (TP), a TRP, or the like. Alternatively, the access network device may be a gNB, a TRP, or a TP in a 5G system, or one antenna panel or a group of antenna panels (including a plurality of antenna panels) of a base station in a 5G system. In addition, the access network device may alternatively be a network node that constitutes a gNB or a TP, for example, a BBU or a distributed unit (DU).

In some deployments, the gNB may include a centralized unit (CU) and a DU. In addition, the gNB may further include an active antenna unit (AAU). The CU implements some functions of the gNB, and the DU implements some functions of the gNB. For example, the CU is responsible for processing a non-real-time protocol and service, and implements functions of a Radio Resource Control (RRC) layer and a Packet Data Convergence Protocol (PDCP) layer. The DU is responsible for processing a physical layer protocol and a real-time service, and implements functions of a radio link control (RLC) layer, a media access control (MAC) layer, and a physical layer (PHY). The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node.

Optionally, communication between the access network device and the terminal device may be performed by using a licensed spectrum, communication may be performed by using an unlicensed spectrum, or communication may be performed by using both a licensed spectrum and an unlicensed spectrum. The access network device and the terminal device may communicate with each other by using a spectrum below 6 gigahertz (GHz), or may communicate with each other by using a spectrum above 6 GHz, or may communicate with each other by using both a spectrum below 6 GHz and a spectrum above 6 GHz. Spectrum resources used between the access network device and the terminal device are not limited in the embodiments.

Optionally, the terminal device, the access network device, or the location management device in may be deployed on land, for example, in an indoor, outdoor, handheld, or vehicle-mounted scenario, or may be deployed on water, or may be deployed on an airplane, a balloon, or a satellite in the air. A scenario of the terminal device, the access network device, or the location management device is not limited in the embodiments.

Optionally, the terminal device, the access network device, or the location management device includes a hardware layer, an operating system layer that runs on the hardware layer, and an application layer that runs on the operating system layer. The hardware layer includes hardware such as a central processing unit (CPU), a memory management unit (NEU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, the embodiments do not particularly limit a specific structure of an execution body of the method provided in the embodiments, as long as communication can be performed according to the method provided in the embodiments by running a program that records code of the method provided in the embodiments. For example, the execution body of the method provided in the embodiments may be the terminal device, the access network device, or the location management device, or a functional module that is in the terminal device, the access network device, or the location management device and capable of invoking the program and executing the program.

In other words, related functions of the terminal device, the access network device, or the location management device in the embodiments may be implemented by one device, or may be implemented by a plurality of devices together, or may be implemented by one or more functional modules in one device. This is not specifically limited in the embodiments. It can be understood that the foregoing function may be a network element on a hardware device, or may be a software function running on dedicated hardware, or may be a combination of hardware and software, or may be a virtualization function instantiated on a platform (for example, a cloud platform).

Figure 8:
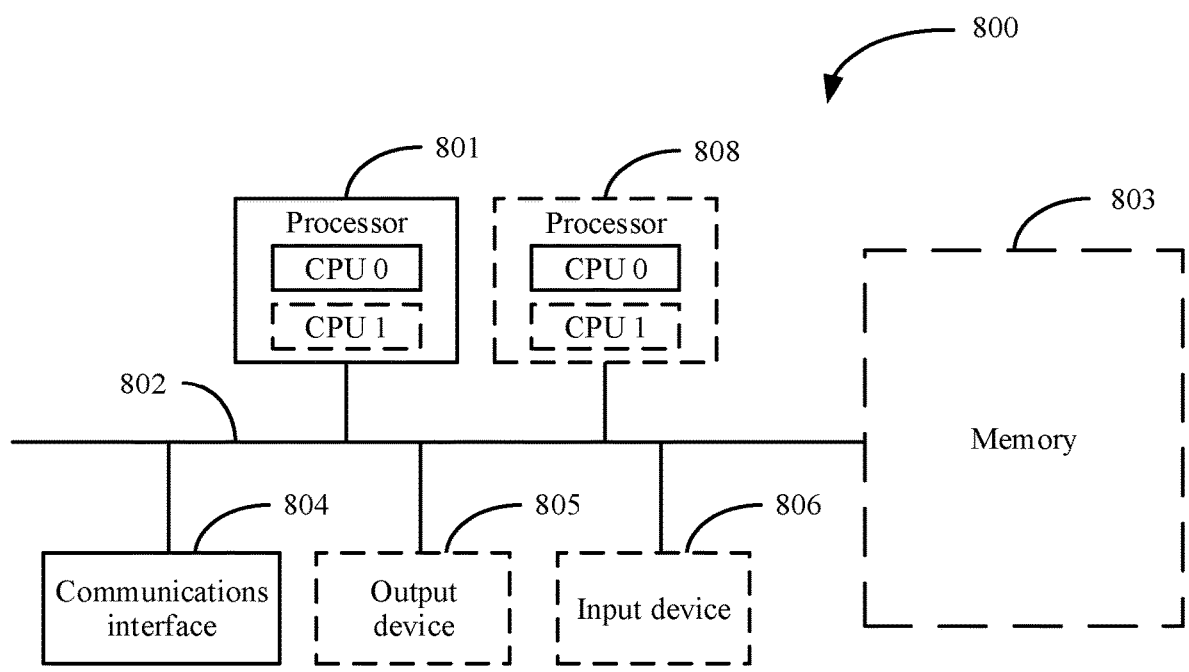
FIG. 8 is a schematic diagram of a structure of a communications apparatus according to an embodiment.

For example, related functions of the terminal device, the access network device, or the location management device may be implemented by a communications apparatus 800 in FIG. 8. FIG. 8 is a schematic diagram of a structure of a communications apparatus 800 according to an embodiment. The communications apparatus 800 includes one or more processors 801, a communications line 802, and at least one communications interface (in FIG. 8, only an example in which a communications interface 804 and one processor 801 are included is used for description). Optionally, the communications apparatus 800 may further include a memory 803.

The processor 801 may be a CPU, a microprocessor, an application-specific integrated circuit (ASIC), or one or more integrated circuits configured to control program execution in the solution.

The communications line 802 may include a path for connecting different components.

The communications interface 804 may be a transceiver module configured to communicate with another device or a communications network, for example, the Ethernet, a RAN, or a wireless local area network (WLAN). For example, the transceiver module may be an apparatus such as a transceiver or a transceiver machine. Optionally, the communications interface 804 may alternatively be a transceiver circuit located in the processor 801, to implement signal input and signal output of the processor.

The memory 803 may be an apparatus having a storage function. The memory may be a read-only memory (ROM) or another type of static storage device that can store static information and instructions, a random-access memory (RAM) or another type of dynamic storage device that can store information and instructions, an electrically erasable programmable ROM (EEPROM), a compact disc ROM (CD-ROM) or another optical disk storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, this is not limited thereto. The memory may stand alone and is connected to the processor through the communications line 802. The memory may alternatively be integrated with the processor.

The memory 803 is configured to store computer-executable instructions for executing the solution, and the processor 801 controls execution of the computer-executable instructions. The processor 801 is configured to execute the computer-executable instructions stored in the memory 803, to implement the positioning method provided in the embodiments.

Alternatively, in this embodiment, the processor 801 may execute processing-related functions in a positioning method provided in the following embodiments, and the communications interface 804 is responsible for communicating with another device or a communications network. This is not specifically limited in this embodiment.

The computer-executable instructions in this embodiment may also be referred to as application program code. This is not specifically limited in this embodiment.

In specific implementation, in one embodiment, the processor 801 may include one or more CPUs, for example, a CPU 0 and a CPU 1 in FIG. 8.

In specific implementation, in one embodiment, the communications apparatus 800 may include a plurality of processors, for example, the processor 801 and a processor 808 in FIG. 8. Each of the processors may be a single-core (single-CPU) processor or a multi-core (multi-CPU) processor. The processor herein may refer to one or more devices, circuits, and/or processing cores configured to process data (for example, computer program instructions).

In specific implementation, in an embodiment, the communications apparatus 800 may further include an output device 805 and an input device 806. The output device 805 communicates with the processor 801, and may display information in a plurality of manners.

The communications apparatus 800 may be a general-purpose apparatus or a dedicated apparatus. For example, the communications apparatus 800 may be a desktop computer, a portable computer, a network server, a PDA, a mobile phone, a tablet computer, a wireless terminal device, an embedded device, or a device having a structure similar to that in FIG. 8. A type of the communications apparatus 800 is not limited in this embodiment.

With reference to FIG. 1 to FIG. 8, the following describes in detail the positioning method provided in the embodiments.

It should be noted that names of messages between network elements, names of parameters in the messages, or the like in the following embodiments are merely examples, and there may be other names in a specific implementation. This is not specifically limited in embodiments.

First, assistance data added relative to assistance data in an existing positioning method is described as follows:

The assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle.

For example, a form of the assistance data may be shown in Table 1.

TABLE 1

| Angle | PRS resource identifier | Power info |
|---|---|---|
| AOD#1 | ID1 | Power information corresponding to an ID1_#1 |
| | ID2 | Power information corresponding to an ID2_#1 |
| | ID3 | Power information corresponding to an ID3_#1 |
| | ... | ... |
| AOD#2 | ID1 | Power information corresponding to an ID1_#2 |
| | ID2 | Power information corresponding to an ID2_#2 |
| | ID3 | Power information corresponding to an ID3_#2 |
| | ... | ... |
| ... | ... | ... |

In a possible implementation, the power information corresponding to each PRS resource identifier at the corresponding preset angle includes a power value corresponding to each PRS resource identifier at the corresponding preset angle.

Optionally, the power value may be a power value obtained through actual measurement, or may be a power value after normalization processing is performed on a power value obtained through actual measurement to eliminate an unknown path loss. This is centrally described herein, and not specifically limited in the embodiments. For a manner of performing normalization processing on the power value obtained through actual measurement to eliminate the unknown path loss, refer to the conventional technology. Details are not described herein.

Optionally, the power value includes a radiated power value, a received power value, or another power value. This is centrally described herein, and not specifically limited in the embodiments. For example, the radiated power value or the received power value may be, for example, an RSRP value, reference signal received quality (RSRQ), a received signal strength indicator (RSSI), or a signal-to-interference-plus-noise (SINR) or a signal-to-noise ratio (SNR). This is not specifically limited in the embodiments.

In another possible implementation, the power information corresponding to each PRS resource identifier at the corresponding preset angle includes a value obtained after the power value corresponding to each PRS resource identifier at the corresponding preset angle is compressed. In this manner, because the power value corresponding to each PRS resource identifier at the corresponding preset angle is compressed, signaling overheads can be reduced during transmission of the assistance data, and a positioning latency and power consumption can be reduced.

A plurality of methods are available for compressing the power value corresponding to each PRS resource identifier at the corresponding preset angle. In the embodiments, two compression methods are provided as examples: a lossless compression method and a lossy compression method.

The lossless compression method may include the following two compression scenarios.

Scenario 1: The power information corresponding to each PRS resource identifier at the corresponding preset angle includes a value relative to a reference first power value, for the power value corresponding to each PRS resource identifier at the corresponding preset angle. The first power value is a largest one of power values corresponding to the one or more PRS resource identifiers at the corresponding preset angle. In other words, the first power value is a largest value obtained after the power values corresponding to the one or more PRS resource identifiers at the corresponding preset angle are sorted at the corresponding preset angle.

The value relative to the reference first power value, for the power value corresponding to each PRS resource identifier at the corresponding preset angle, may be implemented by using the following difference method or quotient method.

In the difference method, power values corresponding to all PRS resource identifiers at the corresponding preset angle are first sorted (for example, the power values may be in ascending order or descending order); and then by using a largest one (that is, the foregoing first power value) of the power values corresponding to the one or more PRS resource identifiers at the corresponding preset angle as a reference, subtraction is performed between the first power value and the power value corresponding to each PRS resource identifier at the corresponding preset angle to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in Table 2.

TABLE 2

| Angle | PRS resource identifier | Power value |
|---|---|---|
| AOD#1 = 2° | ID1 | 9.5 |
| | ID2 | 5.6 |
| | ID3 | 3 |
| | ID4 | 12.1 |
| AOD#2 = 4° | ID1 | 4.1 |
| | ID2 | 11.5 |
| | ID3 | 2 |
| | ID4 | 6.7 |

Using sorting in descending order as an example, when AOD #1=2°, a result obtained after power values corresponding to a plurality of PRS resource identifiers are sorted at the corresponding preset angle is {12.1, 9.5, 5.6, 3}. Further, by using 12.1 as a reference, subtraction is performed between 12.1 and the power value corresponding to each PRS resource identifier at the corresponding preset angle (results are rounded to integers), so that power information corresponding to the plurality of PRS resource identifiers at AOD #1=2° can be obtained, as shown in Table 3.

Similarly, using sorting in descending order as an example, when AOD #2=4°, a result obtained after power values corresponding to the plurality of PRS resource identifiers are sorted at the corresponding preset angle is {11.5, 6.7, 4.1, 2}. Further, by using 11.5 as a reference, subtraction is performed between 11.5 and the power value corresponding to each PRS resource identifier at the corresponding preset angle (results are rounded to integers), so that power information corresponding to the plurality of PRS resource identifiers at AOD #2=4° can be obtained, as shown in Table 3.

TABLE 3

| Angle | PRS resource identifier | Power info |
|---|---|---|
| AOD#1 = 2° | ID1 | 3 |
| | ID2 | 7 |
| | ID3 | 9 |
| | ID4 | 0 |
| AOD#2 = 4° | ID1 | 7 |
| | ID2 | 0 |
| | ID3 | 10 |
| | ID4 | 5 |

It should be noted that Table 3 is described by using an example in which the power value corresponding to each PRS resource identifier at the corresponding preset angle is subtracted from the first power value. Certainly, the first power value may alternatively be subtracted from the power value corresponding to each PRS resource identifier at the corresponding preset angle, and a result is shown in Table 4. This is not specifically limited in the embodiments.

TABLE 4

| Angle | PRS resource identifier | Power info |
|---|---|---|
| AOD#1 = 2° | ID1 | −3 |
| | ID2 | −7 |
| | ID3 | −9 |
| | ID4 | 0 |
| AOD#2 = 4° | ID1 | −7 |
| | ID2 | 0 |
| | ID3 | −10 |
| | ID4 | −5 |

In the quotient method, power values corresponding to all PRS resource identifiers at the corresponding preset angle are first sorted (for example, the power values may be in ascending order or descending order); and then by using a largest one (that is, the foregoing first power value) of the power values corresponding to the one or more PRS resource identifiers at the corresponding preset angle as a reference, division is performed between the first power value and the power value corresponding to each PRS resource identifier at the corresponding preset angle, to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD #1=2°, a result obtained after power values corresponding to a plurality of PRS resource identifiers are sorted at the corresponding preset angle is {12.1, 9.5, 5.6, 3}. Further, by using 12.1 as a reference, division is performed between 12.1 and the power value corresponding to each PRS resource identifier at the corresponding preset angle (results are rounded to integers), so that power information corresponding to the plurality of PRS resource identifiers at AOD #1=2° can be obtained, as shown in Table 5.

Similarly, using sorting in descending order as an example, when AOD #2=4°, a result obtained after power values corresponding to the plurality of PRS resource identifiers are sorted at the corresponding preset angle is {11.5, 6.7, 4.1, 2}. Further, by using 11.5 as a reference, division is performed between 11.5 and the power value corresponding to each PRS resource identifier at the corresponding preset angle (results are rounded to integers), so that power information corresponding to the plurality of PRS resource identifiers at AOD #2=4° can be obtained, as shown in Table 5.

TABLE 5

| Angle | PRS resource identifier | Power info |
|---|---|---|
| AOD#1 = 2° | ID1 | (1, 3) |
| | ID2 | (2, 1) |
| | ID3 | (4, 0) |
| | ID4 | (1, 0) |
| AOD#2 = 4° | ID1 | (2, 3) |
| | ID2 | (1, 0) |
| | ID3 | (6, 0) |
| | ID4 | (1, 5) |

It should be noted that Table 5 is described by using an example in which the first power value is divided by the power value corresponding to each PRS resource identifier at the corresponding preset angle. Certainly, the power value corresponding to each PRS resource identifier at the corresponding preset angle may alternatively be divided by the first power value. This is not specifically limited in the embodiments.

Scenario 2: The power information corresponding to each PRS resource identifier at the corresponding preset angle includes a value relative to a reference second power value, for the power value corresponding to each PRS resource identifier at the corresponding preset angle. The second power value is a largest one of power values corresponding to different PRS resource identifiers at the one or more preset angles at the corresponding preset angle. In other words, the second power value is a largest value obtained after the power values corresponding to the one or more PRS resource identifiers at the corresponding preset angle are sorted at all preset angles.

The value relative to the reference second power value, for the power value corresponding to each PRS resource identifier at the corresponding preset angle, may be implemented by using the following difference method or quotient method.

In the difference method, power values corresponding to different PRS resource identifiers at the one or more preset angles at the corresponding preset angle are first sorted (for example, the power values may be in ascending order or descending order); and then by using a largest one (that is, the foregoing second power value) of the power values corresponding to the different PRS resource identifiers at the one or more angles at the corresponding preset angle as a reference, subtraction is performed between the second power value and the power value corresponding to each PRS resource identifier at the corresponding preset angle to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2.

Using sorting in descending order as an example, when AOD #1=2° and AOD #2=4°, a result obtained after power values corresponding to a plurality of PRS resource identifiers are sorted at the corresponding preset angle is {12.1, 11.5, 9.5, 6.7, 5.6, 4.1, 3, 2}. Further, by using 12.1 as a reference, subtraction is performed between 12.1 and the power value corresponding to each PRS resource identifier at the corresponding preset angle (results are rounded to integers), so that power information corresponding to the plurality of PRS resource identifiers at AOD #1=2° can be obtained, as shown in Table 6.

TABLE 6

| Angle | PRS resource identifier | Power info |
| --- | --- | --- |
| AOD#1 = 2° | ID1 | 3 |
| | ID2 | 7 |
| | ID3 | 9 |
| | ID4 | 0 |
| AOD#2 = 4° | ID1 | 8 |
| | ID2 | 1 |
| | ID3 | 10 |
| | ID4 | 5 |

It should be noted that Table 6 is described by using an example in which the power value corresponding to each PRS resource identifier at the corresponding preset angle is subtracted from the second power value. Certainly, the second power value may alternatively be subtracted from the power value corresponding to each PRS resource identifier at the corresponding preset angle. This is not specifically limited in the embodiments.

In the quotient method, power values corresponding to different PRS resource identifiers at the one or more preset angles at the corresponding preset angle are first sorted (for example, the power values may be in ascending order or descending order); and then by using a largest one (that is, the foregoing second power value) of the power values corresponding to the different PRS resource identifiers at the one or more angles at the corresponding preset angle as a reference, division is performed between the second power value and the power value corresponding to each PRS resource identifier at the corresponding preset angle to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD #1=2° and AOD #2=4°, a result obtained after power values corresponding to a plurality of PRS resource identifiers are sorted at the corresponding preset angle is {12.1, 11.5, 9.5, 6.7, 5.6, 4.1, 3, 2}. Further, by using 12.1 as a reference, division is performed between 12.1 and the power value corresponding to each PRS resource identifier at the corresponding preset angle (results are rounded to integers), so that power information corresponding to the plurality of PRS resource identifiers at AOD #1=2° and AOD #2=4° can be obtained, as shown in Table 7.

TABLE 7

| Angle | PRS resource identifier | Power info |
| --- | --- | --- |
| AOD#1 = 2° | ID1 | (1, 3) |
| | ID2 | (2, 1) |
| | ID3 | (4, 0) |
| | ID4 | (1, 0) |
| AOD#2 = 4° | ID1 | (3, 0) |
| | ID2 | (1, 1) |
| | ID3 | (6, 0) |
| | ID4 | (1, 5) |

It should be noted that Table 7 is described by using an example in which the second power value is divided by the power value corresponding to each PRS resource identifier at the corresponding preset angle. Certainly, the power value corresponding to each PRS resource identifier at the corresponding preset angle may alternatively be divided by the second power value. This is not specifically limited in the embodiments.

The lossy compression method may include the following two compression scenarios.

Scenario 3: The power information corresponding to each PRS resource identifier at the corresponding preset angle includes a value relative to a reference previous power value, for the power value corresponding to each PRS resource identifier at the corresponding preset angle. Power values corresponding to the one or more PRS resource identifiers at the corresponding preset angle are sorted in ascending order or descending order. In other words, the power values corresponding to the one or more PRS resource identifiers at the corresponding preset angle are sorted at the corresponding preset angle.

The value relative to the reference previous power value, for the power value corresponding to each PRS resource identifier at the corresponding preset angle, may be implemented by using the following differential method or differential quotient method.

In the differential method, power values corresponding to all PRS resource identifiers at the corresponding preset angle are first sorted (for example, the power values may be in ascending order or descending order); and then subtraction is performed between a previous power value and a next power value to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD #1=2°, a result obtained after power values corresponding to a plurality of PRS resource identifiers are sorted at the corresponding preset angle is {12.1, 9.5, 5.6, 3}. Further, subtraction is performed between the previous power value and the next power value (the result is rounded to an integer), so that power information corresponding to the plurality of PRS resource identifiers at AOD #1=2° and AOD #2=4° can be obtained, as shown in Table 8.

Similarly, using sorting in descending order as an example, when AOD #2=4°, a result obtained after power values corresponding to the plurality of PRS resource identifiers are sorted at the corresponding preset angle is {11.5, 6.7, 4.1, 2}. Further, subtraction is performed between the previous power value and the next power value (the result is rounded to an integer), so that power information corresponding to the plurality of PRS resource identifiers at AOD #2=4° can be obtained, as shown in Table 8.

TABLE 8

| Angle | PRS resource identifier | Power info |
|---|---|---|
| AOD#1 = 2° | ID1 | 3 |
| | ID2 | 3 |
| | ID3 | 3 |
| | ID4 | 0 |
| AOD#2 = 4° | ID1 | 3 |
| | ID2 | 0 |
| | ID3 | 2 |
| | ID4 | 5 |

It should be noted that, to avoid error accumulation, the previous power value may be a compressed power value. For example, when AOD #1=2°, the power information 3 corresponding to the ID2 is not obtained by directly subtracting a third power value (5.6) from a second power value (9.5), but obtained by directly subtracting the third power value (5.6) from a compressed second power value (9). This is centrally described herein, and not described again later.

It should be noted that Table 8 is described by using an example in which the next power value is subtracted from the previous power value after the power values are sorted in descending order. Certainly, the previous power value may alternatively be subtracted from the next power value after the power values are sorted in descending order. Alternatively, the next power value may be subtracted from the previous power value after the power values are sorted in ascending order. Alternatively, the previous power value may be subtracted from the next power value after the power values are sorted in ascending order. This is not specifically limited in the embodiments.

In the differential quotient method, power values corresponding to all PRS resource identifiers at the corresponding preset angle are first sorted (for example, the power values may be in ascending order or descending order); and then division is performed between a previous power value and a next power value to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD #1=2°, a result obtained after power values corresponding to a plurality of PRS resource identifiers are sorted at the corresponding preset angle is {12.1, 9.5, 5.6, 3}. Further, subtraction is performed between the previous power value and the next power value (the result is rounded to an integer), so that power information corresponding to the plurality of PRS resource identifiers at AOD #1=2° can be obtained, as shown in Table 9.

Similarly, using sorting in descending order as an example, when AOD #2=4°, a result obtained after power values corresponding to the plurality of PRS resource identifiers are sorted at the corresponding preset angle is {11.5, 6.7, 4.1, 2}. Further, subtraction is performed between the previous power value and the next power value (the result is rounded to an integer), so that power information corresponding to the plurality of PRS resource identifiers at AOD #2=4° can be obtained, as shown in Table 9.

TABLE 9

| Angle | PRS resource identifier | Power info |
|---|---|---|
| AOD#1 = 2° | ID1 | (1, 3) |
| | ID2 | (1, 3) |
| | ID3 | (2, 0) |
| | ID4 | (1, 0) |
| AOD#2 = 4° | ID1 | (1, 3) |
| | ID2 | (1, 0) |
| | ID3 | (2, 0) |
| | ID4 | (1, 5) |

It should be noted that Table 9 is described by using an example in which the previous power value is divided by the next power value after the power values are sorted in descending order. Certainly, the next power value may be divided by the previous power value after the power values are sorted in descending order. Alternatively, the previous power value may be divided by the next power value after the power values are sorted in ascending order. Alternatively, the next power value may be divided by the previous power value after the power values are sorted in ascending order. This is not specifically limited in the embodiments.

Scenario 4: The power information corresponding to each PRS resource identifier at the corresponding preset angle includes a value relative to a reference previous power value, for the power value corresponding to each PRS resource identifier at the corresponding preset angle. Power values corresponding to different PRS resource identifiers at the one or more preset angles at the corresponding preset angle are sorted in ascending order or descending order. In other words, the power values corresponding to the one or more PRS resource identifiers at the corresponding preset angle are sorted at all preset angles.

The value relative to the reference previous power value, for the power value corresponding to each PRS resource identifier at the corresponding preset angle, may be implemented by using the following differential method or differential quotient method.

In the differential method, power values corresponding to different PRS resource identifiers at the one or more preset angles at the corresponding preset angle are first sorted (for example, the power values may be in ascending order or descending order); and then subtraction is performed between a previous power value and a next power value to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD #1=2° and AOD #2=4°, a result obtained after power values corresponding to a plurality of PRS resource identifiers are sorted at the corresponding preset angle is {12.1, 11.5, 9.5, 6.7, 5.6, 4.1, 3, 2}. Further, subtraction is performed between the previous power value and the next power value (the result is rounded to an integer), so that power information corresponding to the plurality of PRS resource identifiers at AOD #1=2° and AOD #2=4° can be obtained, as shown in Table 10.

TABLE 10

| Angle | PRS resource identifier | Power info |
|---|---|---|
| AOD#1 = 2° | ID1 | 2 |
| | ID2 | 1 |
| | ID3 | 1 |
| | ID4 | 0 |
| AOD#2 = 4° | ID1 | 2 |
| | ID2 | 1 |
| | ID3 | 1 |
| | ID4 | 2 |

It should be noted that Table 10 is described by using an example in which the next power value is subtracted from the previous power value after the power values are sorted in descending order. Certainly, the previous power value may alternatively be subtracted from the next power value after the power values are sorted in descending order. Alternatively, the next power value may be subtracted from the previous power value after the power values are sorted in ascending order. Alternatively, the previous power value may be subtracted from the next power value after the power values are sorted in ascending order. This is not specifically limited in the embodiments.

In the differential quotient method, power values corresponding to different PRS resource identifiers at the one or more preset angles at the corresponding preset angle are first sorted (for example, the power values may be in ascending order or descending order); and then division is performed between a previous power value and a next power value to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD #1=2° and AOD #2=4°, a result obtained after power values corresponding to a plurality of PRS resource identifiers are sorted at the corresponding preset angle is {12.1, 11.5, 9.5, 6.7, 5.6, 4.1, 3, 2}. Further, division is performed between the previous power value and the next power value (the result is rounded to an integer), so that power information corresponding to the plurality of PRS resource identifiers at AOD #1=2° and AOD #2=4° can be obtained, as shown in Table 11.

TABLE 11

| Angle | PRS resource identifier | Power info |
|---|---|---|
| AOD#1 = 2° | ID1 | (1, 2) |
| | ID2 | (1, 1) |
| | ID3 | (1, 1) |
| | ID4 | (1, 0) |
| AOD#2 = 4° | ID1 | (1, 2) |
| | ID2 | (1, 1) |
| | ID3 | (1, 1) |
| | ID4 | (1, 2) |

It should be noted that Table 11 is described by using an example in which the previous power value is divided by the next power value after the power values are sorted in descending order. Certainly, the next power value may be divided by the previous power value after the power values are sorted in descending order. Alternatively, the previous power value may be divided by the next power value after the power values are sorted in ascending order. Alternatively, the next power value may be divided by the previous power value after the power values are sorted in ascending order. This is not specifically limited in the embodiments.

It should be understood that, in the foregoing scenario 4, after the differential method or the differential quotient method is used to determine the value relative to the reference previous power value, for the power value corresponding to each PRS resource identifier at the corresponding preset angle, an order of presentation of each group of mapping relationships in the assistance data should also be based on a power value sorting result. In other words, using the foregoing Table 10 as an example, the order of presentation of each group of mapping relationships in the assistance data during transmission may be shown in Table 12. Therefore, it is convenient to sequentially restore the power value corresponding to each PRS resource identifier at the corresponding preset angle. This is centrally described herein, and not described again later.

TABLE 12

| Angle | PRS resource identifier | Power info |
|---|---|---|
| AOD#1 = 2° | ID4 | 0 |
| AOD#2 = 4° | ID2 | 1 |
| AOD#1 = 2° | ID1 | 2 |
| AOD#2 = 4° | ID4 | 2 |
| AOD#1 = 2° | ID2 | 1 |
| AOD#2 = 4° | ID1 | 2 |
| AOD#1 = 2° | ID3 | 1 |
| AOD#2 = 4° | ID3 | 1 |

It should be understood that the foregoing provides only several methods for compressing the power value corresponding to each PRS resource identifier at the corresponding preset angle, and does not constitute a limitation on the technical solutions provided in the embodiments. A person skilled in the art may understand that another compression method may also be available, so that after compression is performed on the assistance data, signaling overheads can be reduced during transmission of the assistance data. This is not specifically limited in the embodiments.

It should be understood that, when a plurality of compression methods are available, different compression methods may be selected based on a distribution status or compression requirements of the power values corresponding to the plurality of PRS resource identifiers at the corresponding preset angle, and each compression method may be used for a plurality of times or may be used in combination with other compression methods. For example, the differential method or the differential quotient method is applicable to a case in which a difference between values is relatively large. Because a smaller compressed value can be obtained in this way, signaling overheads are reduced to a greater extent.

It should be understood that, in the solution in which the power values corresponding to the one or more PRS resource identifiers at the corresponding preset angle are sorted at the corresponding preset angle, the first power value may not need to be transmitted during transmission of the assistance data. This is because when determining power information corresponding to one or more PRS resource identifiers at each of a plurality of to-be-measured angles, a positioning device (for example, an LMF network element in the following embodiments) may determine the power information based on a sorting result after power values corresponding to the one or more PRS resource identifiers at the corresponding to-be-measured angle are sorted at the corresponding to-be-measured angle in a same manner. However, in the solution in which the power values corresponding to the one or more PRS resource identifiers at the corresponding preset angle are sorted at all preset angles, the second power value needs to be transmitted during transmission of the assistance data. This is because when determining power information corresponding to one or more PRS resource identifiers at each of a plurality of to-be-measured angles, a positioning device needs to determine the power information by referring to the second power value; or a positioning device needs to restore, at all to-be-measured angles based on the second power value, power values corresponding to the PRS resource identifiers at the corresponding to-be-measured angle. This is not specifically limited in the embodiments.

Optionally, the one or more PRS resource identifiers included in each group of mapping relationships are PRS resource identifiers of all PRS resources that need to be measured at the corresponding preset angle. Alternatively, the one or more PRS resource identifiers included in each group of mapping relationships are PRS resource identifiers of some PRS resources that need to be measured at the corresponding preset angle.

In comparison with a case in which the one or more PRS resource identifiers included in each group of mapping relationships are PRS resource identifiers of all PRS resources that need to be measured at the corresponding preset angle, if the one or more PRS resource identifiers included in each group of mapping relationships are PRS resource identifiers of some PRS resources that need to be measured at the corresponding preset angle, a data amount of the assistance data may be reduced to some extent. Therefore, signaling overheads can be reduced during transmission of the assistance data, and the positioning latency and power consumption can be reduced. In comparison with a case in which the one or more PRS resource identifiers included in each group of mapping relationships are PRS resource identifiers of some PRS resources that need to be measured at the corresponding preset angle, if the one or more PRS resource identifiers included in each group of mapping relationships are PRS resource identifiers of all PRS resources that need to be measured at the corresponding preset angle, accuracy of angle estimation can be improved, and the positioning accuracy is improved to a greater extent.

In a possible implementation, if power values corresponding to PRS resource identifiers of all PRS resources that need to be measured at the corresponding preset angle are sorted in descending order, some PRS resources include PRS resources corresponding to first M power values after the sorting, where M is a positive integer greater than 1.

For example, it is assumed that the power values corresponding to PRS resource identifiers of all PRS resources that need to be measured at the corresponding preset angle are shown in Table 2, and M=3. Assuming that the power information corresponding to each PRS resource identifier at the corresponding preset angle includes the power value corresponding to each PRS resource identifier at the corresponding preset angle, the assistance data provided in the embodiments may be shown in Table 13.

TABLE 13

| Angle | PRS resource identifier | Power value |
|---|---|---|
| AOD#1 = 2° | ID4 | 12.1 |
|  | ID1 | 9.5 |
|  | ID2 | 5.6 |

TABLE 13-continued

| Angle | PRS resource identifier | Power value |
|---|---|---|
| AOD#2 = 4° | ID2 | 11.5 |
|  | ID4 | 6.7 |
|  | ID1 | 4.1 |

Certainly, if the power information corresponding to each PRS resource identifier at the corresponding preset angle includes the value obtained after the power value corresponding to each PRS resource identifier at the corresponding preset angle is compressed, the assistance data provided in the embodiments is values obtained by compressing the first M power values obtained after the power values corresponding to the PRS resource identifiers of all PRS resources that need to be measured at the corresponding preset angle are sorted in descending order. For a corresponding compression method, refer to the foregoing embodiment. Details are not described herein again.

Figure 9A:
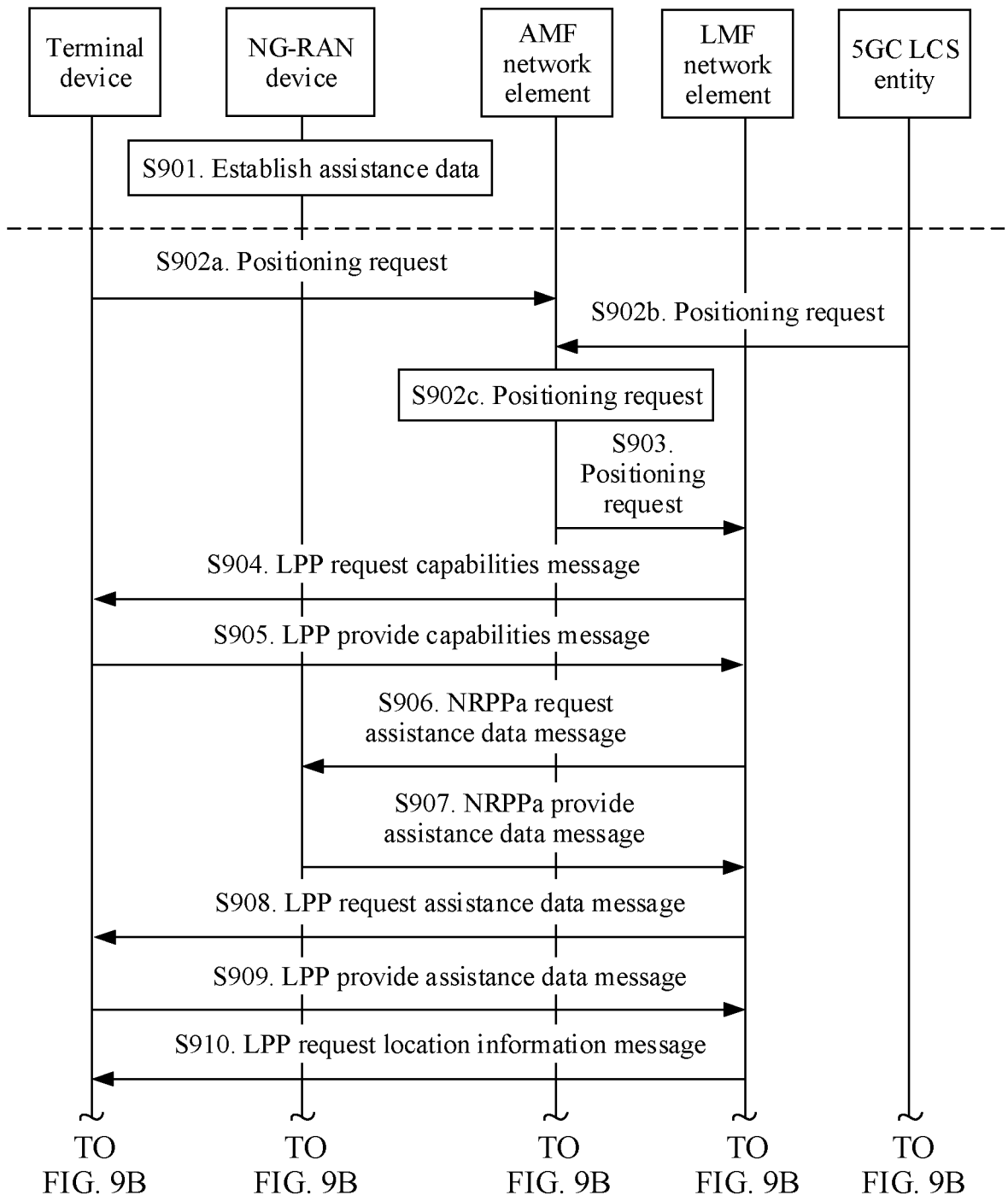
FIG. 9A and FIG. 9B are a schematic flowchart of a positioning method according to an embodiment.
Figure 9B:
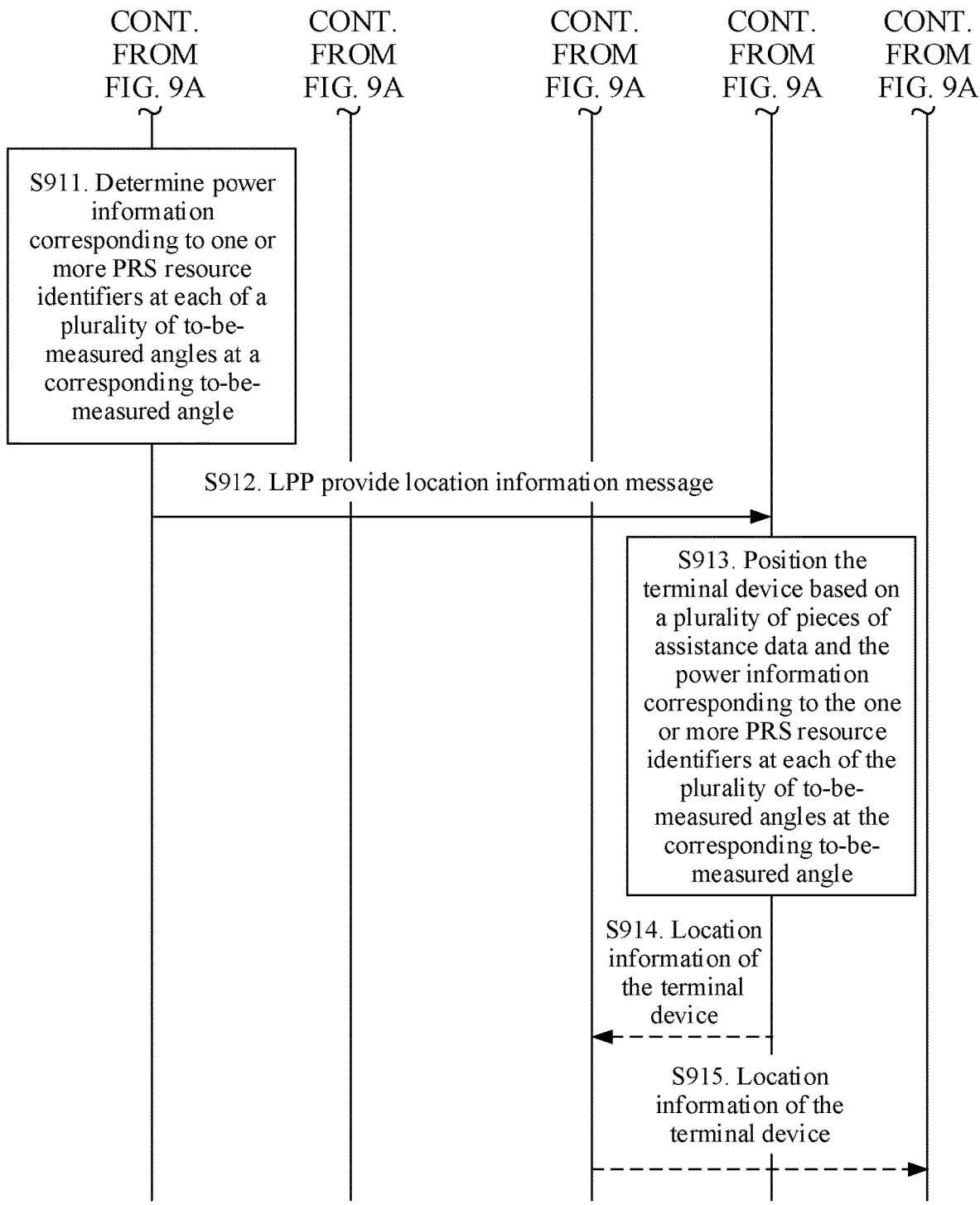

With reference to the foregoing description of the assistance data, assuming that the positioning system shown in FIG. 5 is applied to a 5G mobile communications system and that the access network device is an NG-RAN device, and referring to the positioning system shown in FIG. 6 or FIG. 7, an embodiment provides a positioning method. As shown in FIG. 9A and FIG. 9B, the positioning method includes the following steps.

S901. An NG-RAN device establishes assistance data, where the assistance data includes one or more groups of mapping relationships corresponding to one or more angles.

Optionally, the NG-RAN device may obtain, from a terminal device, a power value corresponding to each of one or more PRS resource identifiers at one or more preset angles, and establish the assistance data based on the power value corresponding to each of the one or more PRS resource identifiers at the one or more preset angles. A power value corresponding to a PRS resource identifier at a preset angle may be an average value of power values obtained by the NG-RAN device from different terminal devices and corresponding to the PRS resource identifier at the preset angle, or may be a power value obtained by the NG-RAN device from a terminal device and corresponding to the PRS resource identifier at the preset angle. This is not specifically limited in this embodiment.

For example, the power value corresponding to each of the one or more PRS resource identifiers at the one or more preset angles may be shown in the foregoing Table 2.

When power information of each PRS resource identifier in the one or more groups of mapping relationships at a corresponding preset angle includes a power value corresponding to each PRS resource identifier at the corresponding preset angle, that the NG-RAN device establishes the assistance data based on the power value corresponding to each of the one or more PRS resource identifiers at the one or more preset angles specifically includes: the NG-RAN device establishes the one or more groups of mapping relationships corresponding to the one or more preset angles, where each of the one or more groups of mapping relationships corresponds to one of the one or more preset angles, and each group of mapping relationships includes a mapping relationship between each of the one or more PRS resource identifiers and a power value corresponding to each PRS resource identifier at a corresponding preset angle.

When power information of each PRS resource identifier in the one or more groups of mapping relationships at a corresponding preset angle includes a value obtained after a power value corresponding to each PRS resource identifier at the corresponding preset angle is compressed, that the NG-RAN device establishes the assistance data based on the power value corresponding to each of the one or more PRS resource identifiers at the one or more preset angles specifically includes: the NG-RAN device first compresses, by using the data compression method provided in the foregoing embodiment, the power value corresponding to each PRS resource identifier at the corresponding preset angle, and further establishes one or more groups of mapping relationships corresponding to the one or more preset angles, where each of the one or more groups of mapping relationships corresponds to one of the one or more preset angles, and each group of mapping relationships includes a mapping relationship between each of the one or more PRS resource identifiers and the value obtained after the power value corresponding to each PRS resource identifier at the corresponding preset angle is compressed.

Optionally, the NG-RAN device may periodically update the assistance data. For example, the assistance data is updated based on power values recently obtained from different terminal devices and corresponding to each of the one or more PRS resource identifiers at the one or more preset angles. Because the assistance data is periodically updated, accuracy of the assistance data can be ensured, and further, accuracy of subsequently estimating a to-be-measured angle can be improved, and positioning accuracy is improved to a greater extent.

It should be noted that step S901 may be considered as an offline part, that is, a step performed before a positioning procedure of a terminal device is started. This is not specifically limited in this embodiment.

Further, a positioning procedure may be initiated by performing the following step S902a, S902b, or S902c.

S902a. The terminal device sends a positioning request to an AMF network element. Correspondingly, the AMF network element receives the positioning request from the terminal device. The positioning request is used to request to position the terminal device.

In other words, the terminal device may actively initiate a procedure for positioning the terminal device.

S902b. A 5G core (5GC) location services (LCS) entity sends a positioning request to the AMF network element. Correspondingly, the AMF network element receives the positioning request from the 5GC LCS entity. The positioning request is used to request to position the terminal device.

In other words, the 5GC LCS entity may initiate a procedure for positioning the terminal device.

For example, the 5GC LCS entity may be, for example, a gateway mobile location center (GMLC).

S902c. Determine some positioning service requirements of the terminal device (for example, the terminal device needs an emergency call), and triggers a positioning request by itself.

In other words, the AMF network element may initiate a procedure for positioning the terminal device.

It should be understood that only several manners of initiating a positioning procedure are provided above as examples. There may be another manner of initiating a positioning procedure. This is not specifically limited in this embodiment.

Further, the positioning method further includes the following steps S903 to S909.

S903. The AMF network element sends a positioning request to an LMF network element. Correspondingly, the LMF network element receives the positioning request from the AMF network element. The positioning request is used to request to position the terminal device.

S904. The LMF network element sends an LTE Positioning Protocol (LPP) message 1 to the terminal device. Correspondingly, the terminal device receives the LPP message 1 from the LMF network element. The LPP message 1 is used to request a positioning capability of the terminal device.

For example, as shown in FIG. 9A and FIG. 9B, the LPP message 1 may be, for example, an LPP request capabilities message.

S905. The terminal device sends an LPP message 2 to the LMF network element. The LMF network element receives the LPP message 2 from the terminal device. The LPP message 2 carries the positioning capability of the terminal device.

For example, the positioning capability of the terminal device may be, for example, a UE-assisted DL-time difference of arrival (TDOA) or a UE-assisted DL-AOD in UE-assisted positioning. This is not specifically limited in this embodiment.

For example, as shown in FIG. 9A and FIG. 9B, the LPP message 2 may be, for example, an LPP provide capabilities message.

S906. The LMF network element sends an NR positioning protocol (NRPPa) message 1 to the NG-RAN device. Correspondingly, the NG-RAN device receives the NRPPa message 1 from the LMF network element. The NRPPa message 1 is used to request positioning assistance data.

For example, as shown in FIG. 9A and FIG. 9B, the NRPPa message 1 may be, for example, an NRPPa request assistance data message.

S907. The NG-RAN device sends an NRPPa message 2 to the LMF network element. Correspondingly, the LMF network element receives the NRPPa message 2 from the NG-RAN device. The NRPPa message 2 carries the assistance data provided by the NG-RAN device for the LMF network element.

For example, as shown in FIG. 9A and FIG. 9B, the NRPPa message 2 may be, for example, an NRPPa provide assistance data message.

The assistance data provided by the NG-RAN device for the LMF network element not only includes the one or more groups of mapping relationships corresponding to the one or more preset angles in the foregoing embodiment, but also includes some assistance data that can be provided by the NG-RAN device for the LMF network element for assisted positioning in the conventional technology, for example, location information of the NG-RAN device. This is not specifically limited in this embodiment.

Optionally, in a manner different from the manner of obtaining the assistance data in steps S906 and S907, without being requested, the NG-RAN device may also actively send, to the LMF network element by using an NRPPa message, assistance data that can be provided by the NG-RAN device for the LMF network element. This is not specifically limited in this embodiment.

S908. The LMF network element sends an LPP message 3 to the terminal device. Correspondingly, the terminal device receives the LPP message 3 from the LMF network element. The LPP message 3 is used to request positioning assistance data.

For example, as shown in FIG. 9A and FIG. 9B, the LPP message 3 may be, for example, an LPP request assistance data message.

S909. The terminal device sends an LPP message 4 to the LMF network element. Correspondingly, the LMF network element receives the LPP message 4 from the terminal device. The LPP message 4 carries the assistance data provided by the terminal device for the LMF network element.

For example, as shown in FIG. 9A and FIG. 9B, the LPP message 4 may be, for example, an LPP provide assistance data message.

The assistance data provided by the terminal device for the LMF network element may include, for example, physical cell IDs (PCIs), global cell IDs (GCIs), and P IDs. This is not specifically limited in this embodiment.

Optionally, in a manner different from the manner of obtaining the assistance data in steps S908 and S909, without being requested, the terminal device may actively provide the assistance data for the LMF network element. This is not specifically limited in this embodiment.

It should be noted that the foregoing steps S901 to S909 merely provide an example of a procedure in which one access network device participates in the positioning method when the LMF network element obtains the assistance data. Certainly, in the positioning method, when the LMF network element needs to obtain a plurality of assistance data, participation of a plurality of access network devices may be required. For processing and an interaction procedure (not shown in FIG. 9A and FIG. 9B) of each access network device, refer to processing and the related interaction procedure of the NG-RAN device in the foregoing steps S901 to S909. Details are not described herein again.

Further, the positioning method further includes the following steps S910 and S911.

S910. The terminal device determines power information corresponding to one or more PRS resource identifiers which correspond to each of a plurality of to-be-measured angles.

Optionally, that the terminal device determines power information corresponding to one or more PRS resource identifiers at each of a plurality of to-be-measured angles may include: the terminal device receives a reference signal from the NG-RAN device in FIG. 9A and FIG. 9B, and determines, based on the reference signal, power information corresponding to one or more PRS resource identifiers at a to-be-measured angle at the to-be-measured angle; and the terminal device may receive a reference signal from another access network device (not shown in FIG. 9A and FIG. 9B), and determine, based on the reference signal, power information corresponding to one or more PRS resource identifiers at another to-be-measured angle at the another to-be-measured angle.

Optionally, the terminal device may determine, based on a reference signal, a power value corresponding to one or more PRS resource identifiers at a to-be-measured angle at the to-be-measured angle. Further, in a possible implementation, the terminal device may use the power value corresponding to the one or more PRS resource identifiers at the to-be-measured angle as power information corresponding to the one or more PRS resource identifiers at the to-be-measured angle. Alternatively, in another possible implementation, the terminal device may compress the power value corresponding to the one or more PRS resource identifiers at the to-be-measured angle, and use a value obtained after the power value corresponding to the one or more PRS resource identifiers at the to-be-measured angle is compressed, as power information corresponding to the one or more PRS resource identifiers at the to-be-measured angle. A corresponding compression method is consistent with that on the NG-RAN device side. Refer to the related description in the foregoing assistance data. Details are not described herein again.

Optionally, if the one or more PRS resource identifiers included in each group of mapping relationships in the assistance data are PRS resource identifiers of all PRS resources that need to be measured at the corresponding preset angle, the one or more PRS resource identifiers at each to-be-measured angle are PRS resource identifiers of all PRS resources that need to be measured at the corresponding to-be-measured angle; or if the one or more PRS resource identifiers included in each group of mapping relationships in the assistance data are PRS resource identifiers of some PRS resources that need to be measured at the corresponding preset angle, the one or more PRS resource identifiers at each to-be-measured angle are PRS resource identifiers of some PRS resources that need to be measured at the corresponding to-be-measured angle. In a possible implementation, if power values corresponding to PRS resource identifiers of all PRS resources that need to be measured at the corresponding to-be-measured angle are sorted in descending order, some PRS resources that need to be measured at the corresponding to-be-measured angle include PRS resources corresponding to first M power values after the sorting, where M is a positive integer greater than 1. This is centrally described herein, and not described again later.

S911. The LMF network element sends an LPP message 5 to the terminal device. Correspondingly, the terminal device receives the LPP message 5 from the LMF network element. The LPP message 5 is used to request location information.

For example, as shown in FIG. 9A and FIG. 9B, the LPP message 5 may be, for example, an LPP request location information message.

S912. The terminal device sends an LPP message 6 to the LMF network element. Correspondingly, the LMF network element receives the LPP message 6 from the terminal device. The LPP message 6 carries the power information corresponding to the one or more PRS resource identifiers at each of the plurality of to-be-measured angles at the corresponding to-be-measured angle.

For example, as shown in FIG. 9A and FIG. 9B, the LPP message 6 may be, for example, an LPP provide location information message.

Optionally, in a manner different from the manner of obtaining the location information in steps S910 to S912, without being requested, the terminal device may actively provide the location information for the LMF network element. This is not specifically limited in this embodiment.

S913. The LMF network element positions the terminal device based on the plurality of assistance data and the power information corresponding to the one or more PRS resource identifiers at each of the plurality of to-be-measured angles.

Optionally, that the LMF network element positions the terminal device based on the plurality of assistance data and the power information corresponding to the one or more PRS resource identifiers at each of the plurality of to-be-measured angles at the corresponding to-be-measured angle may include: the LMF network element determines the plurality of to-be-measured angles based on the plurality of assistance data and the power information corresponding to the one or more PRS resource identifiers at each of the plurality of to-be-measured angles at the corresponding to-be-measured angle; and further, the LMF network element positions the terminal device based on the plurality of to-be-measured angles and location information of an access network device corresponding to each of the plurality of to-be-measured angles.

It should be understood that, in addition to the plurality of to-be-measured angles and the location information of the access network device corresponding to each of the plurality of to-be-measured angles, a basis for positioning the terminal device may further include other assistance data obtained by the LMF network element, for example, PCIs, GCIs, TP IDs, and PRS configuration information. This is not specifically limited in this embodiment.

For a manner of positioning the terminal device by the LMF network element based on the plurality of to-be-measured angles and the location information of the access network device corresponding to each of the plurality of to-be-measured angles, refer to the conventional technology. For example, in a DL-AOD positioning method in a two-dimensional plane, location information of the terminal device may be determined with reference to the foregoing formula (1). Details are not described herein again.

In That the LMF network element determines the plurality of to-be-measured angles based on the plurality of assistance data and the power information corresponding to the one or more PRS resource identifiers at each of the plurality of to-be-measured angles at the corresponding to-be-measured angle may include: for any to-be-measured angle, matching is performed between power information corresponding to one or more PRS resource identifiers at the to-be-measured angle at the corresponding to-be-measured angle and one or more groups of mapping relationships included in corresponding assistance data and corresponding to one or more angles; and if a similarity between power information corresponding to one or more PRS resource identifiers included in a group of mapping relationships at a corresponding preset angle and power information corresponding to one or more PRS resource identifiers at the to-be-measured angle at the corresponding to-be-measured angle is highest (for example, a maximum likelihood estimation method is used), the preset angle corresponding to the group of mapping relationships is determined as the to-be-measured angle.

For example, assuming that a to-be-measured angle between the NG-RAN device and the terminal device in FIG. 9A and FIG. 9B is 4°, both the terminal device and the NG-RAN device compress a power value corresponding to each PRS resource identifier at the corresponding preset or to-be-measured angle according to the method described in scenario 1 in the foregoing embodiment. Power information corresponding to each PRS resource identifier in the mapping relationship at the corresponding preset angle is shown in Table 3. Power information obtained by the terminal device and corresponding to one or more PRS resource identifiers at the to-be-measured angle at the corresponding to-be-measured angle is shown in Table 14. Therefore, by comparing Table 14 with Table 3, it can be learned that a similarity between power information corresponding to AOD #2=4° in Table 3 and the power information corresponding to the one or more PRS resource identifiers at the to-be-measured angle at the corresponding to-be-measured angle is highest. Therefore, it can be determined that the to-be-measured angle is 4°.

TABLE 14

| PRS resource identifier | Power info |
| --- | --- |
| ID1 | 7.1 |
| ID2 | 0 |
| ID3 | 10 |
| ID4 | 5 |

It should be understood that when there are a plurality of to-be-measured angles and a plurality of assistance data, any to-be-measured angle is an angle between a PRS resource (beam) of an access network device and a receive beam of the terminal device. In this case, when matching is performed between power information corresponding to one or more PRS resource identifiers at the to-be-measured angle at the corresponding to-be-measured angle and one or more groups of mapping relationships included in corresponding assistance data and corresponding to one or more angles, the corresponding assistance data should be understood as assistance data established by using the access network device. For example, the assistance data corresponding to the to-be-measured angle between the NG-RAN device and the terminal device in FIG. 9A and FIG. 9B is the assistance data established by using the NG-RAN device in FIG. 9A and FIG. 9B. This is centrally described herein, and not described again later.

Optionally, the foregoing steps S910 and S911 are described by using an example in which the terminal device determines the power information corresponding to the one or more PRS resource identifiers at each of the plurality of to-be-measured angles at the corresponding to-be-measured angle, and further, the LMF network element determines the plurality of to-be-measured angles based on the plurality of assistance data and the power information corresponding to the one or more PRS resource identifiers at each of the plurality of to-be-measured angles at the corresponding to-be-measured angle. Certainly, in a scenario in which the assistance data is compressed for transmission, alternatively, the terminal device may determine a power value corresponding to the one or more PRS resource identifiers at each of the plurality of to-be-measured angles at the corresponding to-be-measured angle, and further, the LMF network element determines the plurality of to-be-measured angles based on the plurality of assistance data and the power value corresponding to the one or more PRS resource identifiers at each of the plurality of to-be-measured angles at the corresponding to-be-measured angle. In other words, for any to-be-measured angle, the LMF network element may restore power information corresponding to one or more PRS resource identifiers included in the corresponding assistance data at the corresponding preset angle to a power value corresponding to the one or more PRS resource identifiers at the corresponding preset angle. Further, matching is performed between this power value and the power value corresponding to the one or more PRS resource identifiers at the to-be-measured angle at the corresponding to-be-measured angle, to determine the corresponding to-be-measured angle. This is not specifically limited in this embodiment.

For example, with respect to the compression method in the scenario 4 in the foregoing embodiment, for any to-be-measured angle, the LMF network element may restore, based on a largest value (that is, the foregoing second power value) obtained after power values corresponding to the one or more PRS resource identifiers at the corresponding preset angle are sorted at all preset angles, the power information corresponding to the one or more PRS resource identifiers included in the corresponding assistance data at the corresponding preset angle to the power value corresponding to the one or more PRS resource identifiers at the corresponding preset angle, and further perform matching between this power value and the power value corresponding to the one or more PRS resource identifiers at the to-be-measured angle at the corresponding to-be-measured angle, to determine the corresponding to-be-measured angle.

Optionally, if the positioning procedure is initiated by the 5GC LCS entity (that is, step S902b is performed) or the AMF network element (that is, step S902c is performed), the positioning method further includes the following step S914.

S914. The LMF network element sends the location information of the terminal device to the AMF network element. Correspondingly, the AMF network element receives the location information of the terminal device from the LMF network element.

Optionally, if the positioning procedure is initiated by the 5GC LCS entity (that is, step S902b is performed), the positioning method further includes the following step S915.

S915. The AMF network element sends the location information of the terminal device to the 5GC LCS entity. Correspondingly, the 5GC LCS entity receives the location information of the terminal device from the AMF network element.

Currently, only a rough range of an angle (angle of departure or angle of arrival) can be estimated based on existing assistance data, and high-accuracy positioning cannot be implemented. Based on the positioning method provided, the assistance data includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the LMF network element can accurately estimate a to-be-measured angle based on the plurality of assistance data and the power information corresponding to the one or more PRS resource identifiers at each of the plurality of to-be-measured angles at the corresponding to-be-measured angle, and can further implement high-accuracy positioning.

The processor 801 in the communications apparatus 800 shown in FIG. 8 may perform actions of the terminal device, the NG-RAN device, or the LMF network element in steps S901 to S915 by invoking the application program code stored in the memory 803.

It may be understood that, in the foregoing embodiments, the method and/or step implemented by the location management device may also be implemented by a component (for example, a chip or a circuit) that can be used for the location management device; and the method and/or step implemented by the access network device may also be implemented by a component (for example, a chip or a circuit) that can be used for the access network device.

The foregoing mainly describes the solutions provided in embodiments from a perspective of interaction between network elements. Correspondingly, an embodiment further provides a communications apparatus, and the communications apparatus is configured to implement the foregoing methods. The communications apparatus may be the location management device in the foregoing method embodiment, or an apparatus including the location management device, or a component that can be used for the location management device; or the communications apparatus may be the access network device in the foregoing method embodiment, or an apparatus including the access network device, or a component that can be used for the access network device. It may be understood that, to implement the foregoing functions, the communications apparatus includes a corresponding hardware structure and/or software module for performing each function. A person skilled in the art should be easily aware that units, algorithms, and steps in the examples described with reference to embodiments disclosed in this specification can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

The communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, Division into the modules is an example, and is merely a logical function division. In actual implementation, another division manner may be used.

Figure 10:
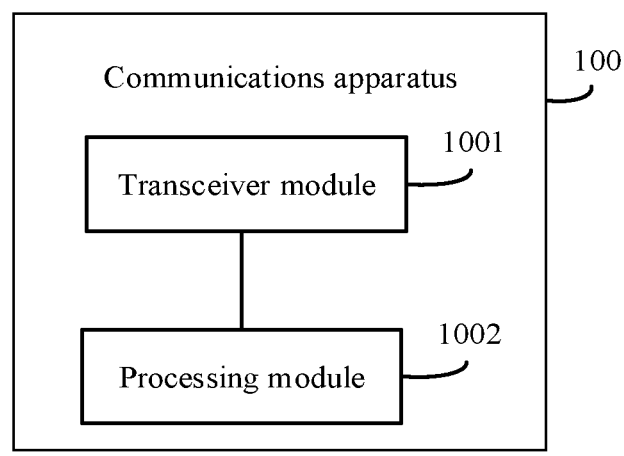
FIG. 10 is a schematic diagram of a structure of another communications apparatus according to an embodiment.

FIG. 10 is a schematic diagram of a structure of a communications apparatus 100 according to an embodiment. The communications apparatus 100 includes a transceiver module 1001 and a processing module 1002. The transceiver module 1001 may also be referred to as a transceiver unit, and is configured to implement a transceiver function. For example, the transceiver module 1001 may be a transceiver circuit, a transceiver machine, a transceiver, or a communications interface.

Assuming that the communications apparatus 100 is the location management device in the foregoing method embodiment, the transceiver module 1001 is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the transceiver module 1001 is further configured to obtain, from a terminal device, power information corresponding to one or more PRS resource identifiers at each of a plurality of to-be-measured angles; and the processing module 1002 is configured to position the terminal device based on the plurality of assistance data and the power information corresponding to the one or more PRS resource identifiers at each of the plurality of to-be-measured angles at the corresponding to-be-measured angle.

Optionally, the processing module 1002 is further configured to: determine the plurality of to-be-measured angles based on the plurality of assistance data and the power information corresponding to the one or more PRS resource identifiers at each of the plurality of to-be-measured angles at the corresponding to-be-measured angle; and position the terminal device based on the plurality of to-be-measured angles and location information of an access network device corresponding to each of the plurality of to-be-measured angles.

Optionally, the transceiver module 1001 is further configured to receive a positioning request from a mobility management network element, where the positioning request is used to request to position the terminal device; and the transceiver module 1001 is further configured to send location information of the terminal device to the mobility management network element.

Assuming that the communications apparatus 100 is the access network device in the foregoing method embodiment, the processing module 1002 is configured to establish or update assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver module 1001 is configured to send the assistance data to a location management device.

Optionally, the transceiver module 1001 is further configured to receive a first request message from the location management device, where the first request message is used to request the assistance data.

Optionally, the corresponding power information includes a power value corresponding to each of the one or more PRS resource identifiers at the corresponding preset or to-be-measured angle.

Optionally, the corresponding power information includes a value obtained after the power value corresponding to each of the one or more PRS resource identifiers at the corresponding preset or to-be-measured angle is compressed.

In a possible implementation, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

In a possible implementation, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

Optionally, the power value includes a radiated power value or a received power value.

Optionally, the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

Optionally, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

All related content of the steps in the foregoing method embodiments may be cited in function descriptions of corresponding function modules. Details are not described herein again.

In this embodiment, the communications apparatus 100 is presented in a form of functional modules obtained through division in an integrated manner. The "module" herein may be a specific ASIC, a circuit, a processor and a memory that execute one or more software or firmware programs, an integrated logic circuit, and/or another component that may provide the foregoing functions.

For example, the processor 801 in the communications apparatus 800 shown in FIG. 8 may invoke the computer-executable instructions stored in the memory 803, so that the communications apparatus 800 performs the positioning method in the foregoing method embodiment.

Specifically, the processor 801 in the communications apparatus 800 shown in FIG. 8 may invoke the computer-executable instructions stored in the memory 803 to implement functions or implementation processes of the transceiver module 1001 and the processing module 1002 in FIG. 10. Alternatively, the processor 801 in the communications apparatus 800 shown in FIG. 8 may invoke the computer-executable instructions stored in the memory 803 to implement functions or an implementation process of the processing module 1002 in FIG. 10, and the communications interface 804 in the communications apparatus 800 shown in FIG. 8 may implement functions or an implementation process of the transceiver module 1001 in FIG. 10.

Because the communications apparatus 100 provided in this embodiment may perform the positioning method in the foregoing method embodiment, for technical effects that can be achieved by the communications apparatus 100, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. The processor may be configured to execute the program instructions to implement the foregoing method procedures. The processor may be integrated into a system-on-chip (SoC) or an ASIC, or may be an independent semiconductor chip. In addition to a core configured to perform an operation or processing by executing software instructions, the processor may further include a hardware accelerator, for example, a field-programmable gate array (FPGA), a programmable logic device (PLD), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete device. The hardware may perform the foregoing method procedures with software or without software.

Figure 11:
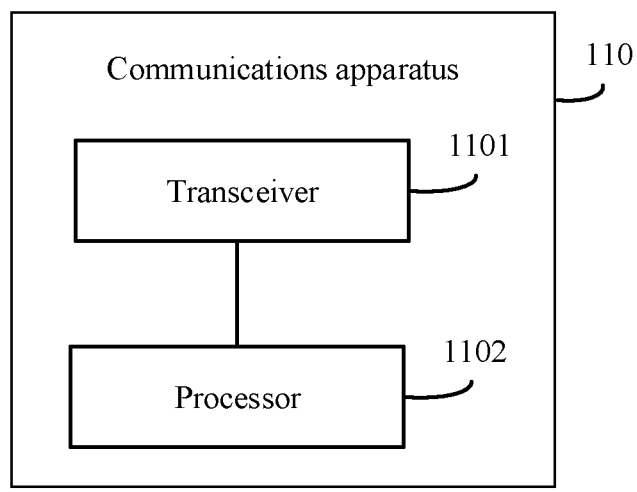
FIG. 11 is a schematic diagram of a structure of yet another communications apparatus according to an embodiment.

FIG. 11 is a schematic diagram of a structure of yet another communications apparatus 110 according to an embodiment. The communications apparatus 110 includes a transceiver 1101 and a processor 1102.

Assuming that the communications apparatus 110 is the location management device in the foregoing method embodiment, the transceiver 1101 is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the transceiver 1101 is further configured to obtain, from a terminal device, power information corresponding to one or more PRS resource identifiers at each of a plurality of to-be-measured angles; and the processor 1102 is configured to position the terminal device based on the plurality of assistance data and the power information corresponding to the one or more PRS resource identifiers at each of the plurality of to-be-measured angles at the corresponding to-be-measured angle.

Optionally, the processor 1102 is further configured to: determine the plurality of to-be-measured angles based on the plurality of assistance data and the power information corresponding to the one or more PRS resource identifiers at each of the plurality of to-be-measured angles at the corresponding to-be-measured angle; and position the terminal device based on the plurality of to-be-measured angles and location information of an access network device corresponding to each of the plurality of to-be-measured angles.

Optionally, the transceiver 1101 is further configured to receive a positioning request from a mobility management network element, where the positioning request is used to request to position the terminal device; and the transceiver 1101 is further configured to send location information of the terminal device to the mobility management network element.

Assuming that the communications apparatus 110 is the access network device in the foregoing method embodiment, the processor 1102 is configured to establish or update assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver 1101 is configured to send the assistance data to a location management device.

Optionally, the transceiver 1101 is further configured to receive a first request message from the location management device, where the first request message is used to request the assistance data.

Optionally, the corresponding power information includes a power value corresponding to each of the one or more PRS resource identifiers at the corresponding preset or to-be-measured angle.

Optionally, the corresponding power information includes a value obtained after the power value corresponding to each of the one or more PRS resource identifiers at the corresponding preset or to-be-measured angle is compressed.

In a possible implementation, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

In a possible implementation, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

Optionally, the power value includes a radiated power value or a received power value.

Optionally, the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

Optionally, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

All related content of the steps in the foregoing method embodiments may be cited in function descriptions of corresponding function modules. Details are not described herein again.

Because the communications apparatus 110 provided in this embodiment may perform the positioning method in the foregoing method embodiment, for technical effects that can be achieved by the communications apparatus 110, refer to the foregoing method embodiment. Details are not described herein again.

Optionally, an embodiment further provides a system-on-chip, including at least one processor and an interface. The at least one processor is coupled to a memory by using the interface. When the at least one processor executes a computer program or computer instructions in the memory, the method in any one of the foregoing method embodiments is performed. Optionally, the system-on-chip may include a chip, or may include a chip and another discrete component. This is not specifically limited in this embodiment.

It Unless otherwise specified, the character "/" indicates an "or" relationship between associated objects. For example, A/B may represent A or B, where A and B may be singular or plural. In addition, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments, terms such as "first" and "second" are used to distinguish between same items or similar items that have basically same functions and purposes. A person skilled in the art may understand that the terms such as "first" and "second" do not limit a quantity and an execution sequence, and the terms such as "first" and "second" do not indicate a definite difference. In addition, the term such as "example" or "for example" is used to represent giving an example, an illustration, or a description. Any embodiment or solution described as "example" or "for example" is not to be construed as being more preferred or having more advantages than other embodiments or solutions. Exactly, use of the word such as "example" or "for example" is intended to present a related concept in a specific manner for ease of understanding.

All or some of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedure or functions are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Although this disclosure is described with reference to embodiments, in a process of implementing this disclosure that claims protection, a person skilled in the art may understand and implement another variation of disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this disclosure is described with reference to specific features and the embodiments thereof, it is clear that various modifications and combinations may be made to them without departing from the spirit and scope of this disclosure. Correspondingly, the specification and the accompanying drawings are merely example descriptions defined by the appended claims, and are considered as any of or all modifications, variations, combinations or equivalents that cover the scope of this disclosure. It is clear that a person skilled in the art can make various modifications and variations without departing from the spirit and scope of this disclosure. This disclosure is intended to cover these modifications and variations provided that they fall within the scope of the claims and equivalent technologies thereof.

What is claimed is:

1. A method implemented by a location management device and comprising:
   obtaining assistance data from access network devices, wherein the assistance data comprise groups of mapping relationships corresponding to preset angles, wherein each of the groups corresponds to one of the preset angles, and wherein each of the groups comprises at least two mapping relationships between one of a plurality of positioning reference signal (PRS) resource identifiers and power information at a corresponding preset angle;
   obtaining, from a terminal device, first power information corresponding to a first PRS resource identifier, wherein the first PRS resource identifier corresponds to a to-be-measured angle; and
   positioning the terminal device based on the assistance data and the first power information.

2. The method of claim 1, wherein the first power information comprises a power value corresponding to the first PRS resource identifier at a corresponding to-be-measured angle.

3. The method of claim 2, wherein the first power information comprises a value that is based on compression of the power value.

4. The method of claim 1, wherein the power information comprises a value relative to a reference power value, and wherein the reference power value is a largest power value corresponding to the PRS resource identifiers.

5. The method of claim 3, wherein the first power information comprises a value relative to a reference power value.

6. The method of claim 2, wherein the power value comprises a radiated power value or a received power value.

7. The method of claim 1, wherein the PRS resource identifiers are all PRS resources that need to be measured at the corresponding preset angle.

8. A communications apparatus comprising:
   a transceiver configured to:
      obtain assistance data from access network devices, wherein the assistance data comprise groups of mapping relationships corresponding to preset angles, wherein each of the groups corresponds to one of the preset angles, and wherein each of the groups comprises at least two mapping relationships between one of a plurality of positioning reference signal (PRS) resource identifiers and power information at a corresponding preset angle; and
      obtain, from a terminal device, first power information corresponding to a first PRS resource identifier, wherein the first PRS resource identifier corresponds to a to-be-measured angle; and
   one or more processors configured to position the terminal device based on the assistance data and the first power information.

9. The communications apparatus of claim 8, wherein the first power information comprises a power value corresponding to the first PRS resource identifier at a corresponding to-be-measured angle.

10. The communications apparatus of claim 9, wherein the first power information comprises a value that is based on compression of the power value.

11. The communications apparatus of claim 8, wherein the power information comprises a value relative to a reference power value, and wherein the reference power value is a largest power value corresponding to the PRS resource identifiers.

12. The communications apparatus of claim 10, wherein the first power information comprises a value relative to a reference power value.

13. The communications apparatus of claim 9, wherein the power value comprises a radiated power value or a received power value.

14. The communications apparatus of claim 8, wherein the PRS resource identifiers are all PRS resources that need to be measured at the corresponding preset angle.

15. A computer program product comprising instructions that are stored on a non-transitory computer-readable medium and that, when executed by one or more processors, cause a communications apparatus to:
- obtain assistance data from access network devices, wherein the assistance data comprise groups of mapping relationships corresponding to preset angles, wherein each of the groups corresponds to one of the preset angles, and wherein each of the groups comprises at least two mapping relationships between one of a plurality of positioning reference signal (PRS) resource identifiers and power information at a corresponding preset angle;
- obtain, from a terminal device, first power information corresponding to a first PRS resource identifier, wherein the first PRS resource identifier corresponds to a to-be-measured angle; and
- position the terminal device based on the assistance data and the first power information.

16. The computer program product of claim 15, wherein the first power information comprises a power value corresponding to the first PRS resource identifier at a corresponding to-be-measured angle.

17. The computer program product of claim 16, wherein the first power information comprises a value that is based on compression of the power value.

18. The computer program product of claim 15, wherein the power information comprises a value relative to a reference power value, and wherein the reference power value is a largest power value corresponding to the PRS resource identifiers.

19. The computer program product of claim 17, wherein the first power information comprises a value relative to a reference power value.

20. The computer program product of claim 15, wherein the PRS resource identifiers are all PRS resources that need to be measured at the corresponding preset angle.

* * * * *